US012746767B2

(12) United States Patent
Kato et al.

(10) Patent No.: US 12,746,767 B2
(45) Date of Patent: Sep. 29, 2026

(54) PRINTER INCLUDING FIRST AND SECOND SUPPORT MEMBERS RESPECTIVELY ATTACHABLE TO FIRST AND SECOND ADJUSTERS PROVIDED IN HOUSING FOR SUPPORTING TWO DIFFERENT TYPES OF ROLLS OF PRINTING MEDIUM

(71) Applicant: BROTHER KOGYO KABUSHIKI KAISHA, Nagoya (JP)

(72) Inventors: Yushi Kato, Nagoya (JP); Arisa Noda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 86 days.

(21) Appl. No.: 18/897,027

(22) Filed: Sep. 26, 2024

(65) Prior Publication Data

US 2025/0108641 A1 Apr. 3, 2025

(30) Foreign Application Priority Data

Sep. 29, 2023 (JP) ................................ 2023-168989

(51) Int. Cl.
*B41J 15/04* (2006.01)

(52) U.S. Cl.
CPC .................................. *B41J 15/042* (2013.01)

(58) Field of Classification Search
CPC . B41J 15/042; B41J 15/02; B41J 15/04; B41J 15/044; B41J 15/18; B65H 16/00; B65H 16/02; B65H 16/06
See application file for complete search history.

(56) References Cited

U.S. PATENT DOCUMENTS

2020/0223239 A1* 7/2020 Yang ..................... B65H 16/06

FOREIGN PATENT DOCUMENTS

JP H11-322142 A 11/1999

* cited by examiner

*Primary Examiner* — Ricardo I Magallanes
*Assistant Examiner* — Sadman Sakib Bakht
(74) *Attorney, Agent, or Firm* — Kenealy Vaidya LLP

(57) ABSTRACT

A printer includes a housing, first and second adjusters provided in the housing, and first and second support members detachably attachable to the respective first and second adjusters. The first and second adjusters face each other in a second direction such that a distance therebetween is adjustable. Each support member includes: a plate part having a first surface and a second surface opposite each other; a first protruding part protruding from the first surface; and a second protruding part protruding from the second surface. Each adjuster has a hook extending toward each other in the second direction. When the respective first surfaces oppose each other in the second direction, each first protruding part is fitted in a first sleeve of a first roll. When the respective second surfaces oppose each other in the second direction, each second protruding part is fitted in a second sleeve of a second roll.

6 Claims, 11 Drawing Sheets

PRINTER INCLUDING FIRST AND SECOND SUPPORT MEMBERS RESPECTIVELY ATTACHABLE TO FIRST AND SECOND ADJUSTERS PROVIDED IN HOUSING FOR SUPPORTING TWO DIFFERENT TYPES OF ROLLS OF PRINTING MEDIUM

REFERENCE TO RELATED APPLICATIONS

This application claims priority from Japanese Patent Application No. 2023-168989 filed on Sep. 29, 2023. The entire content of the priority application is incorporated herein by reference.

BACKGROUND ART

There has been known a printer configured to perform printing on a medium paid out from a roll of the medium. One conventional printer includes a movable support member and a stationary support member for retaining, therebetween, a roll through an iron core. The iron core is configured to penetrate through a paper sleeve of the roll.

Each support member includes a base plate, a first attachment portion protruding from one surface of the base plate, and a second attachment portion protruding from the other surface of the base plate. The first attachment portion and the second attachment portion have different outer diameters from each other. A user attaches the first attachment portion or the second attachment portion of each support member to the iron core such that the respective first attachment portions face each other, or the respective second attachment portions face each other in conformance with an inner diameter of the sleeve of the roll. The attachment portions facing each other are fitted in the sleeve of the roll. The stationary support member is fixed to the iron core by a screw. The movable support member is movable relative to the iron core in an axial direction thereof, and is not fixed to the iron core.

SUMMARY

In the conventional printer described above, the movable support member may be disengaged from the iron core if the movable support member is moved in a direction away from the stationary support member. In this case, supporting the roll by the iron core at a position between the movable support member and the stationary support member becomes difficult. Further, in this conventional printer, in a case where exchange in positions of the first attachment portion and the second attachment portion is required in the stationary support member, a user must pull off the stationary support member from the iron core after the screw is unfastened from the stationary support member. As such, a user may encounter difficulty in selectively using two types of the rolls having different inner diameters from each other.

In view of the foregoing, it is an object of the present disclosure to provide a printer capable of securely supporting a roll and facilitating employment of two types of rolls having different inner diameters from each other.

In order to attain the above and other objects, according to one aspect of the disclosure, the present disclosure provides a printer configured to perform printing on either a first elongated printing medium paid out from a first roll or a second elongated printing medium paid out from a second roll, the first roll having a first sleeve over which the first elongated printing medium is wound, the second roll having a second sleeve over which the second elongated printing medium is wound, the second sleeve having an inner diameter greater than an inner diameter of the first sleeve. The printer includes a housing, a first adjuster, a second adjuster, a first support member and a second support member. The housing is open in a first direction. The housing provides an accommodation space for accommodating therein either the first roll or the second roll such that the first sleeve or the second sleeve extends in a second direction perpendicular to the first direction. The first adjuster is provided in the accommodation space. The second adjuster is provided in the accommodation space. The first adjuster and the second adjuster face each other in the second direction such that a distance therebetween in the second direction is adjustable. The first support member is attachable to and detachable from the first adjuster. The second support member is attachable to and detachable from the second adjuster. The first support member includes a first support plate part, a first protruding part, and a second protruding part. The first support plate part has a first surface and a second surface opposite each other in the second direction. The first support plate part has a first support hole penetrating through the first support plate part in the second direction from the first surface to the second surface. The first protruding part protrudes from the first surface and surrounds the first support hole. The first protruding part has a first outer diameter. The second protruding part protrudes from the second surface and surrounds the first support hole. The second protruding part has a second outer diameter greater than the first outer diameter. The first support member is attachable to the first adjuster such that either the first surface or the second surface of the first support plate part faces the second adjuster in the second direction. The second support member includes a second support plate part, a first protruding part, and a second protruding part. The second support plate part has a first surface and a second surface opposite each other in the second direction. The second support plate part has a second support hole penetrating through the second support plate part in the second direction from the first surface of the second support plate part to the second surface of the second support plate part. The first protruding part of the second support member protrudes from the first surface of the second support plate part and surrounds the second support hole. The first protruding part of the second support member has the first outer diameter. The second protruding part of the second support member protrudes from the second surface of the second support plate part and surrounds the second support hole. The second protruding part of the second support member has the second outer diameter. The second support member is attachable to the second adjuster such that either the first surface of the second support plate part or the second surface of the second support plate part faces the first adjuster in the second direction. The first adjuster includes a first hook extending toward the second adjuster in the second direction. The first hook extends through the first support hole and engages with the first support plate part upon attachment of the first support member to the first adjuster. The second adjuster includes a second hook extending toward the first adjuster in the second direction. The second hook extends through the second support hole and engages with the second support plate part upon attachment of the second support member to the second adjuster. In a first state where the first support member and the second support member are attached to the first adjuster and the second adjuster respectively such that the first surface of the first support member and the first surface the second support member oppose each other in the second direction, the first protruding part of the first support member and the first protruding part of the second support member are fitted in the first sleeve of the first roll when the first roll is accommodated in the accommodation space. In a second state where the first support member and the second support member are attached to the first adjuster and the second adjuster respectively such that the second surface of the first support member and the second surface of the second support member oppose each other in the second direction, the second protruding part of the first support member and the second protruding part of the second support member are fitted in the second sleeve of the second roll when the second roll is accommodated in the accommodation space.

According to the above-described structure, the first support member can be securely attached to the first adjuster by the first hook. A user can attach and detach the first support member to and from the first adjuster by inserting and pulling the first hook into and off the first support hole. Further, the second support member can be securely attached to the second adjuster by the second hook. A user can attach and detach the second support member to and from the second adjuster by inserting and pulling the second hook into and off the second support hole. Hence, the printer according to the one aspect can securely support the first roll and the second roll, and can contribute to easy and selective employment of the two types of the rolls having inner diameters different from each other.

DESCRIPTION

Hereinafter, one embodiment of the present disclosure will be described with reference to accompanying drawings.

First, a structure of a printer 1 according to the one embodiment will be described with reference to FIGS. 1 through 3.

In the following description, the upper-left side, lower-right side, lower-left side, upper-right side, upper side, and lower side in FIG. 1 will be referred to as a left side, a right side, a front side, a rear side, a top and a bottom of the printer 1. Further, as a matter of convenience, the terms such as "up-down direction," "left-right direction" and "front-rear direction" will be used merely for an explanatory purpose. The "up-down direction" need not to be a vertical direction, and the "left-right direction" and "front-rear direction" need not be a horizontal direction.

Figure 1:
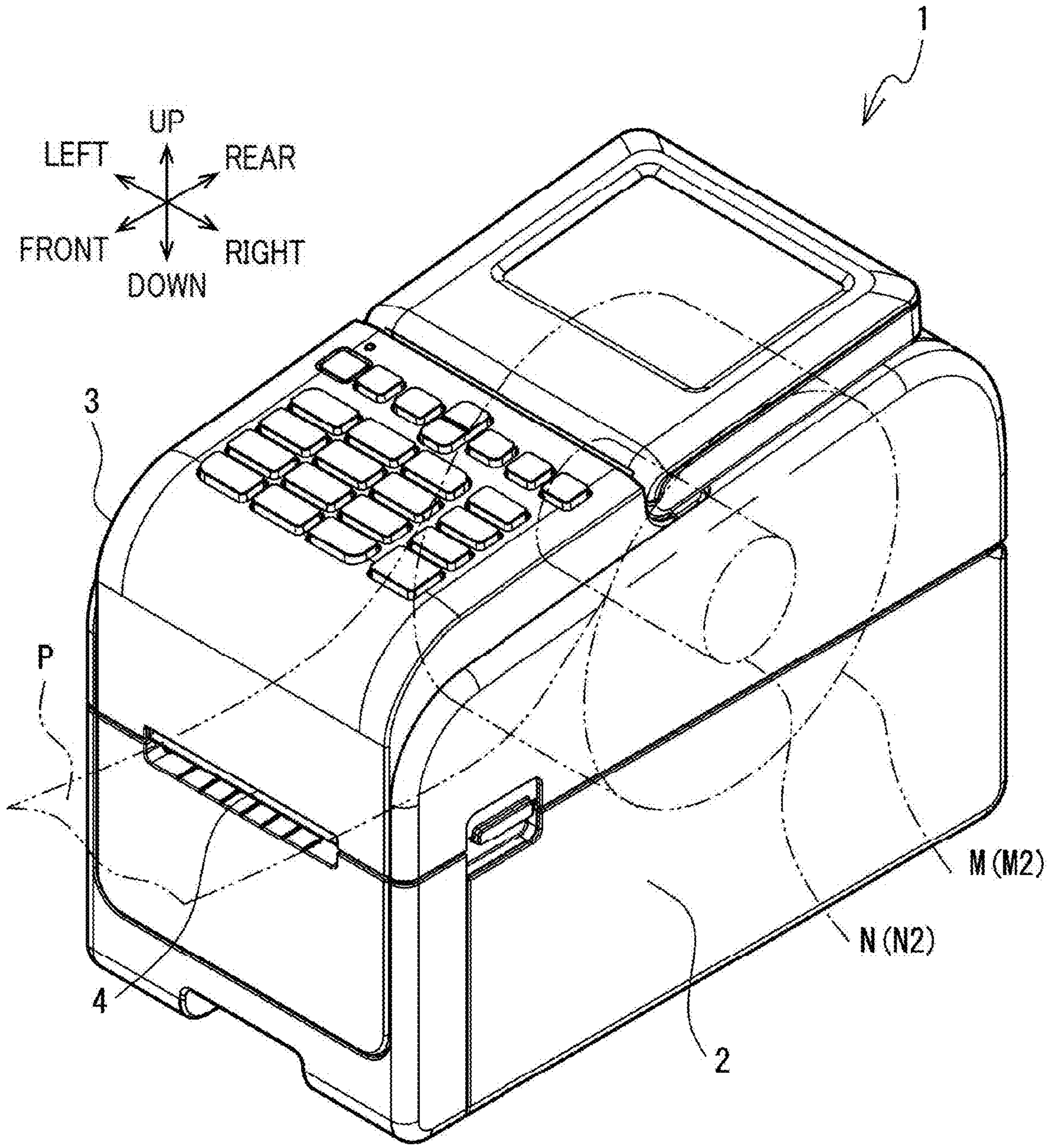
FIG. 1 is a perspective view of a printer 1 according to one embodiment of the disclosure as viewed from an upper right front side thereof in a state where a roll M2 is accommodated in the printer 1 and a cover 3 is closed.

The printer 1 illustrated in FIG. 1 is a thermal printer configured to perform printing on an elongated tape medium P.

Referring to FIG. 1, as an outer shell, the printer 1 includes a housing 2 and a cover 3. The housing 2 has a generally rectangular parallelepiped box-like shape elongated in the front-rear direction. The housing 2 constitutes a lower portion of the outer shell of the printer 1. The housing 2 is open upward to have an open upper end (see FIG. 2).

The cover 3 also has a generally rectangular parallelepiped box-like shape elongated in the front-rear direction. The cover 3 constitutes an upper portion of the outer shell of the printer 1. The cover 3 is pivotally movable, relative to the housing 2, about an axis extending in the left-right direction at an upper rear end of the housing 2. The cover 3 closes the open upper end of the housing 2 while the cover 3 is opened as illustrated in FIG. 1, whereas the cover 3 exposes the open upper end of the housing 2 while the cover 3 is opened as illustrated in FIG. 2.

A discharge opening 4 is a gap formed between a front wall of the housing 2 and a front wall of the cover 3 that is closed. The discharge opening 4 extends in the left-right direction. Through the discharge opening 4, the printed tape medium P is configured to be discharged toward an outside of the printer 1.

An internal structure of the printer 1 will be described next with reference to FIGS. 2 and 3.

Figure 2:
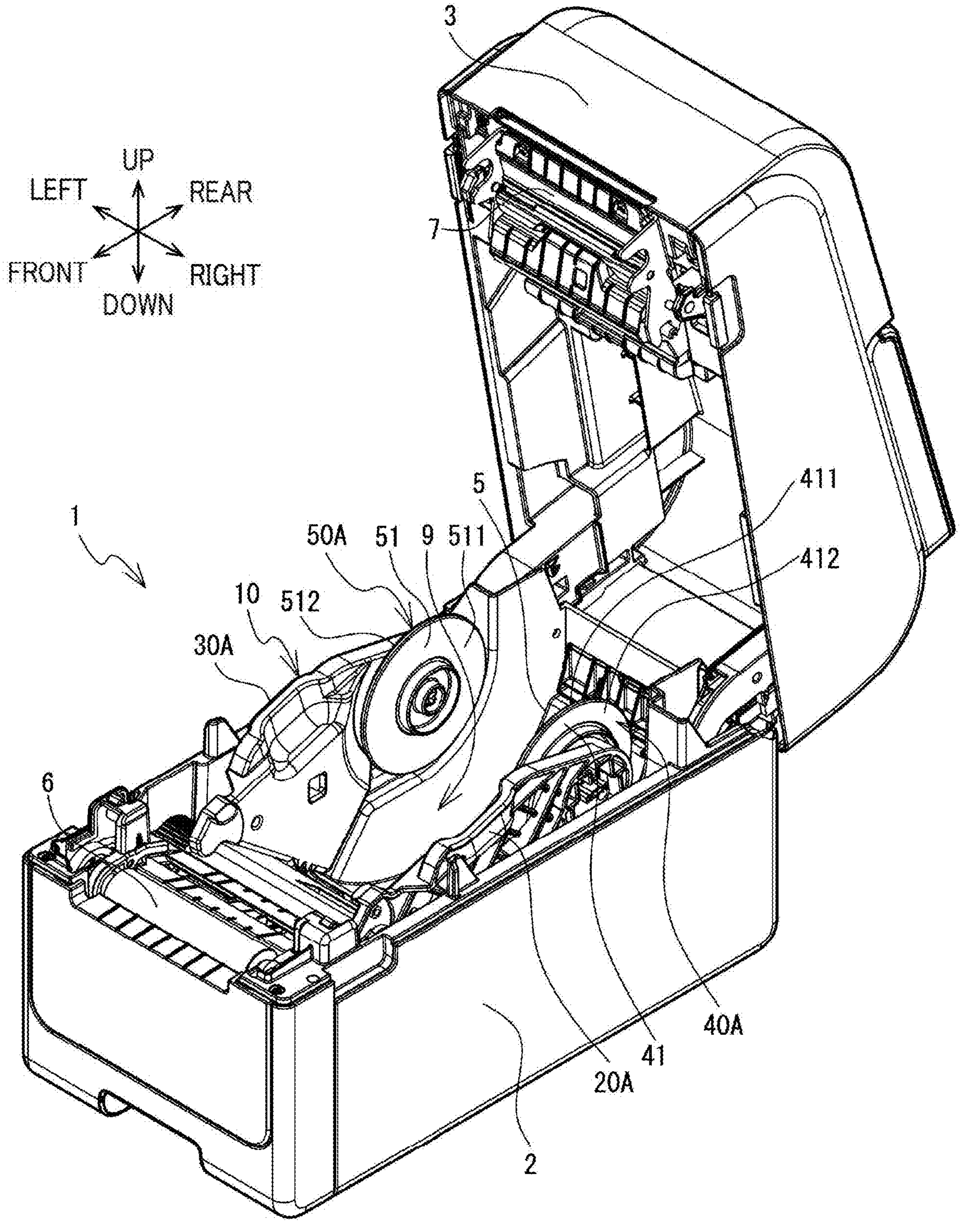
FIG. 2 is a perspective view of the printer 1 as viewed from the upper right front side thereof in a state where the cover 3 is opened.
Figure 3:
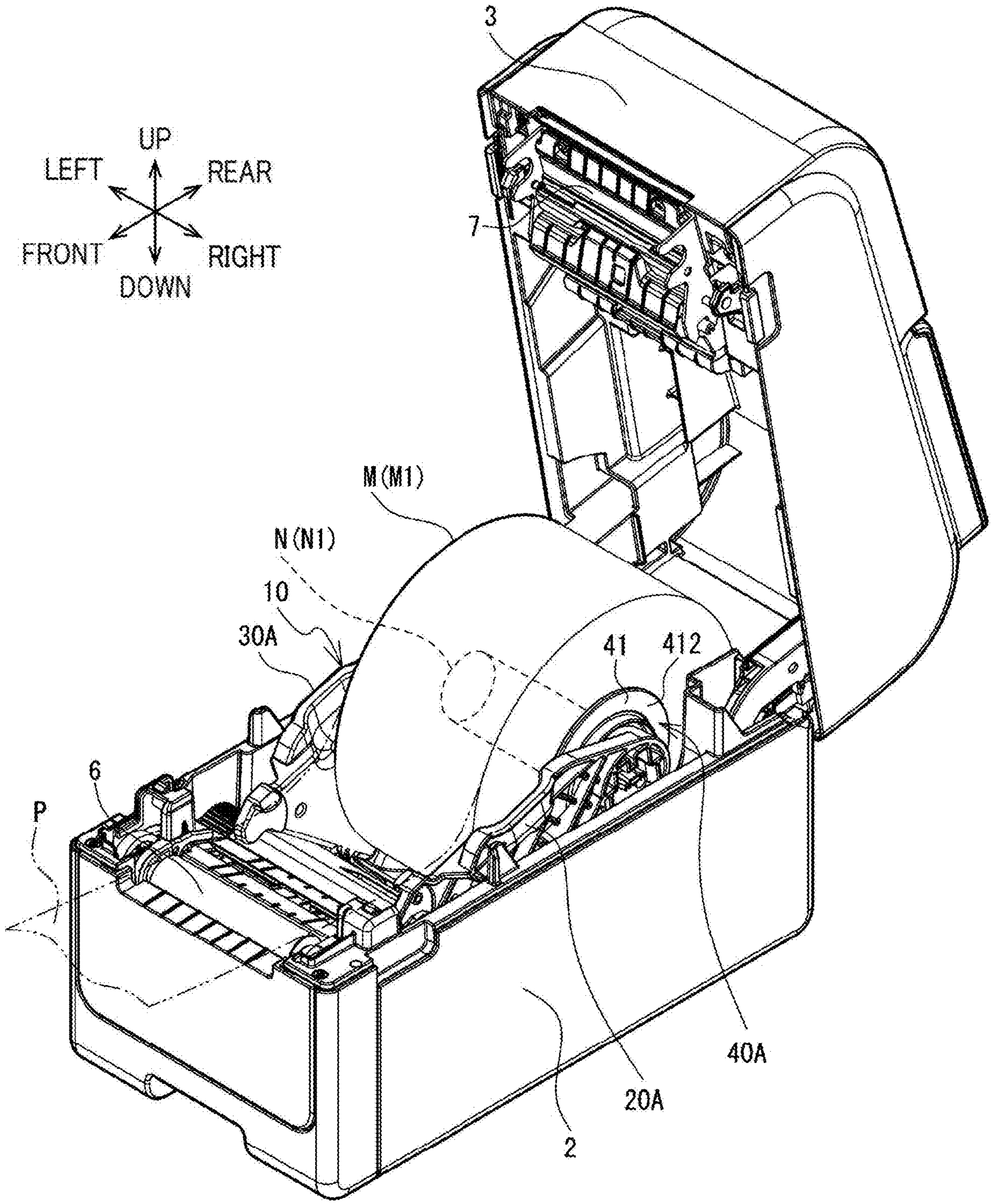
FIG. 3 is a perspective view of the printer 1 as viewed from the upper right front side thereof in a state where a roll M1 is accommodated in the printer 1 and the cover 3 is opened.

As illustrated in FIG. 2, provided inside the housing 2 are a housing cover 5, a support mechanism 10, and a platen roller 6. The housing cover 5 is positioned in a lower portion of the housing 2, and is a plate-like member having an arcuate shape that is curved downward in a side view (see FIG. 4). The housing cover 5 has a rear end that is positioned at substantially the same position as a rear end of the housing 2. The housing cover 5 has a front end that is positioned between a front end of the housing 2 and a front-rear center of the housing 2.

The housing cover 5 defines an accommodation space 9 inside the housing 2. The accommodation space 9 is a space in which a part of a tape roll M can be accommodated, as illustrated in FIG. 3. The tape roll M is configured of a sleeve N and the tape medium P wound over the sleeve N. The tape medium P may be a paper tape, a plastic sheet tape, and the like. The sleeve N defines an axis extending in the left-right direction in a state where the tape roll M is accommodated in the accommodation space 9.

In the preset embodiment, the tape roll M may be of two types, a roll M1 (see FIG. 3) and a roll M2 (see FIG. 1). Either the roll M1 or the roll M2 is selectively accommodated in the printer 1. The roll M1 has a sleeve N1 whose inner diameter is greater than an inner diameter of a sleeve N2 of the roll M2. The sleeve N2 has an inner diameter greater than that of the sleeve N1.

The support mechanism 10 is configured to rotatably support the roll M1 or the roll M2 accommodated in the accommodation space 9. Details of the support mechanism 10 will be described later.

The platen roller 6 is positioned between the front end of the housing 2 and the front end of the housing cover 5. The platen roller 6 has a solid cylindrical shape defining an axis extending in the left-right direction. The platen roller 6 is supported by the housing 2 so as to be rotatable about the axis. The platen roller 6 is rotatable upon receipt of a driving force from a motor (not illustrated), and is configured to pay out the tape medium P from the attached tape roll M (M1 or M2).

A thermal head 7 is provided on a bottom end of the cover 3. The thermal head 7 is a plate-like member extending in the left-right direction. The thermal head 7 includes a plurality of heat generating elements arranged in line in the left-right direction. The thermal head 7 is configured to face the platen roller 6 with a slight gap therebetween in the up-down direction while the cover 3 is closed. The thermal head 7 is configured to apply heat to the tape medium P through the selected heat generating elements to form an image on the tape medium P.

Next, the support mechanism 10 will be described in detail with reference to FIGS. 2 through 8.

Figure 5:
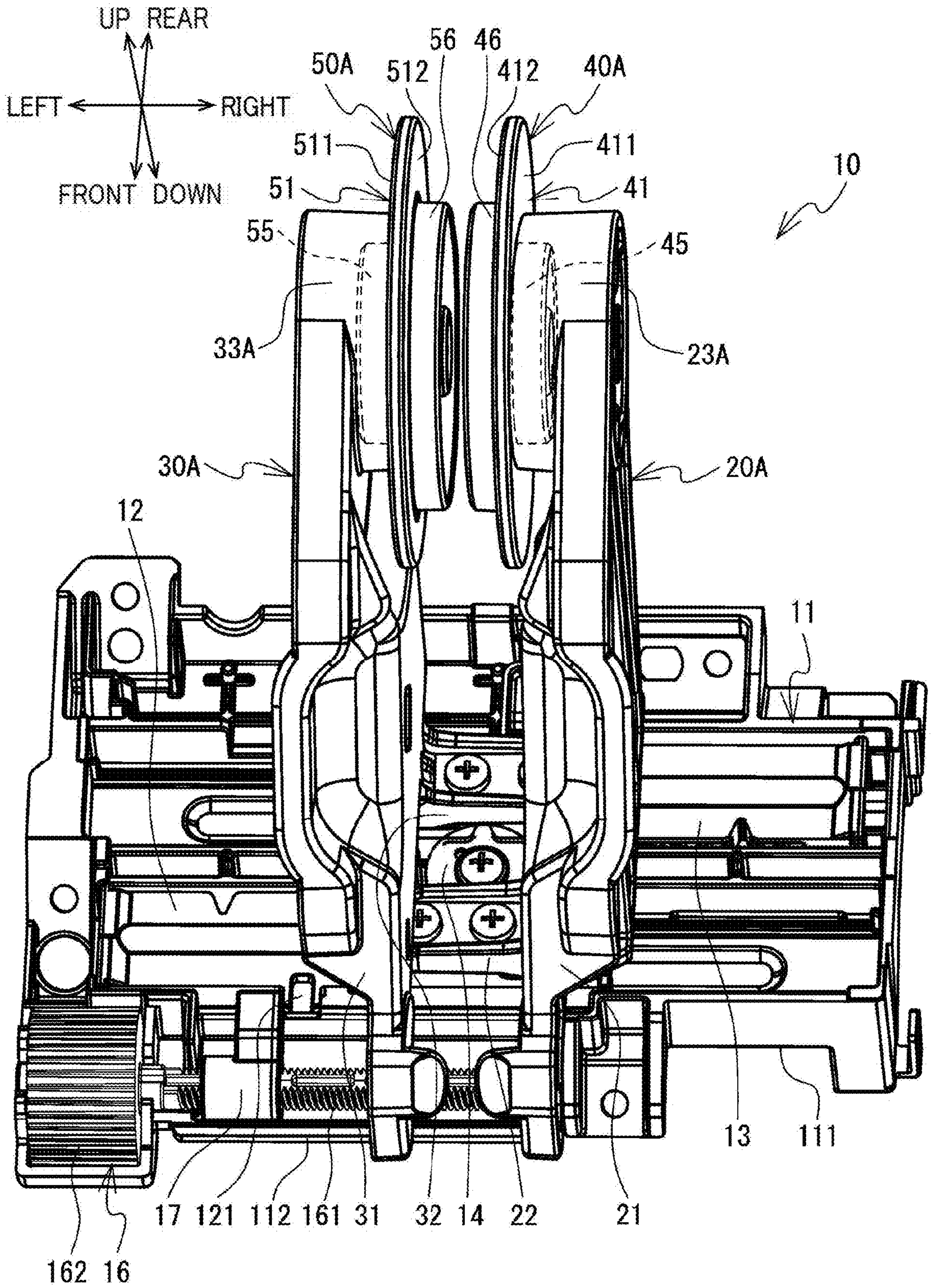
FIG. 5 is a perspective view of a support mechanism 10 as viewed from an upper right front side thereof.

As illustrated in FIG. 5, the support mechanism 10 includes a support base 11, a first adjuster 20A, a second adjuster 30A, a first support member 40A, and a second support member 50A.

On the support base 11, guide members 12 and 13, a pinion gear 14, a first coil spring (not illustrated), a second coil spring (not illustrated), a position adjuster 16, and a nut 17 are provided.

The support base 11 has a main base part 111, and a front support part 112. In a plan view, the main base part 111 has a generally rectangular parallelepiped box-like shape that is elongated in the left-right direction. The front support part 112 protrudes frontward from a front end of the main base part 111. The front support part 112 is a plate-like member having a generally rectangular parallelepiped that is elongated in the left-right direction in a plan view.

The front support part 112 has a left end that is generally aligned with a left end of the main base part 111 in the left-right direction. The front support part 112 has a right end that is positioned between a right end of the main base part 111 and a center of the main base part 111 in the left-right direction.

The guide members 12 and 13 are positioned above the main base part 111 and are supported by the main base part 111. Each guide member 12, 13 has a generally rectangular shape elongated in the left-right direction in a plan view. The guide members 12 and 13 are arrayed with each other in the front-rear direction. Specifically, the guide member 12 is positioned frontward of the guide member 13. The guide members 12 and 13 are movable in the left-right direction relative to the main base part 111. The guide member 13 has a front end provided with a rack gear (not illustrated). The guide member 12 has a rear end provided with a rack gear (not illustrated). The guide member 12 has a front end provided with an engagement part 121. The engagement part 121 protrudes frontward from the front end of the guide member 12.

The pinion gear 14 is positioned above the main base part 111 and at a center of the main base part 111 in the left-right direction. The pinion gear 14 is positioned between the guide members 12 and 13 in the front-rear direction. The pinion gear 14 is in meshing engagement with each of the rack gear of the guide member 12 and the rack gear of the guide member 13. The pinion gear 14 is rotatable about an axis extending in the up-down direction.

As the guide member 12 moves rightward, the pinion gear 14 is rotated counterclockwise in a plan view, thereby moving the guide member 13 leftward. Reversely, as the guide member 12 moves leftward, the pinion gear 14 is rotated clockwise in a plan view, thereby moving the guide member 13 rightward.

The first coil spring (not illustrated) is provided to connect between a left end of the main base part 111 and a right end of the guide member 12. The first coil spring normally urges the guide member 12 leftward. The second coil spring is provided to connect between a right end of the main base part 111 and a left end of the guide member 13. The second coil spring normally urges the guide member 13 rightward.

The position adjuster 16 is positioned above the front support part 112. The position adjuster 16 includes a male thread part 161 and an operation part 162. The male thread part 161 has a rod-like shape extending in the left-right direction. The male thread part 161 defines an axis extending in the left-right direction. The male thread part 161 is rotatable about its axis at a position above the front support part 112.

The operation part 162 is generally cylindrical in shape and has an axis extending in the left-right direction. The operation part 162 is rotatable about its axis. The operation part 162 is connected to a left end of the male thread part 161. The axis of the male thread part 161 is coincident with the axis of the operation part 162. That is, the male thread part 161 and the operation part 162 are coaxially provided with each other. The operation part 162 and the male thread part 161 are rotatable together in response to a user's operation to rotate the operation part 162.

The nut 17 is threadingly engaged with the male thread part 161 at a position above the front support part 112. The nut 17 is movable in the left-right direction by the rotation of the male thread part 161 in accordance with the user's operation to the operation part 162 to rotate the same in forward and reverse directions. Since the guide member 12 is normally urged leftward by the first coil spring, the engagement part 121 of the guide member 12 abuts on the nut 17 from the right side. That is, the left surface of the engagement part 121 abuts on the right surface of the nut 17. The position of the nut 17 in the left-right direction determines the position in the left-right direction of the guide member 12, which in turn determines the position in the left-right direction of the guide member 13 through the pinion gear 14.

Next, a structure of the first adjuster 20A will be described with reference to FIGS. 5 through 8.

Figure 6:
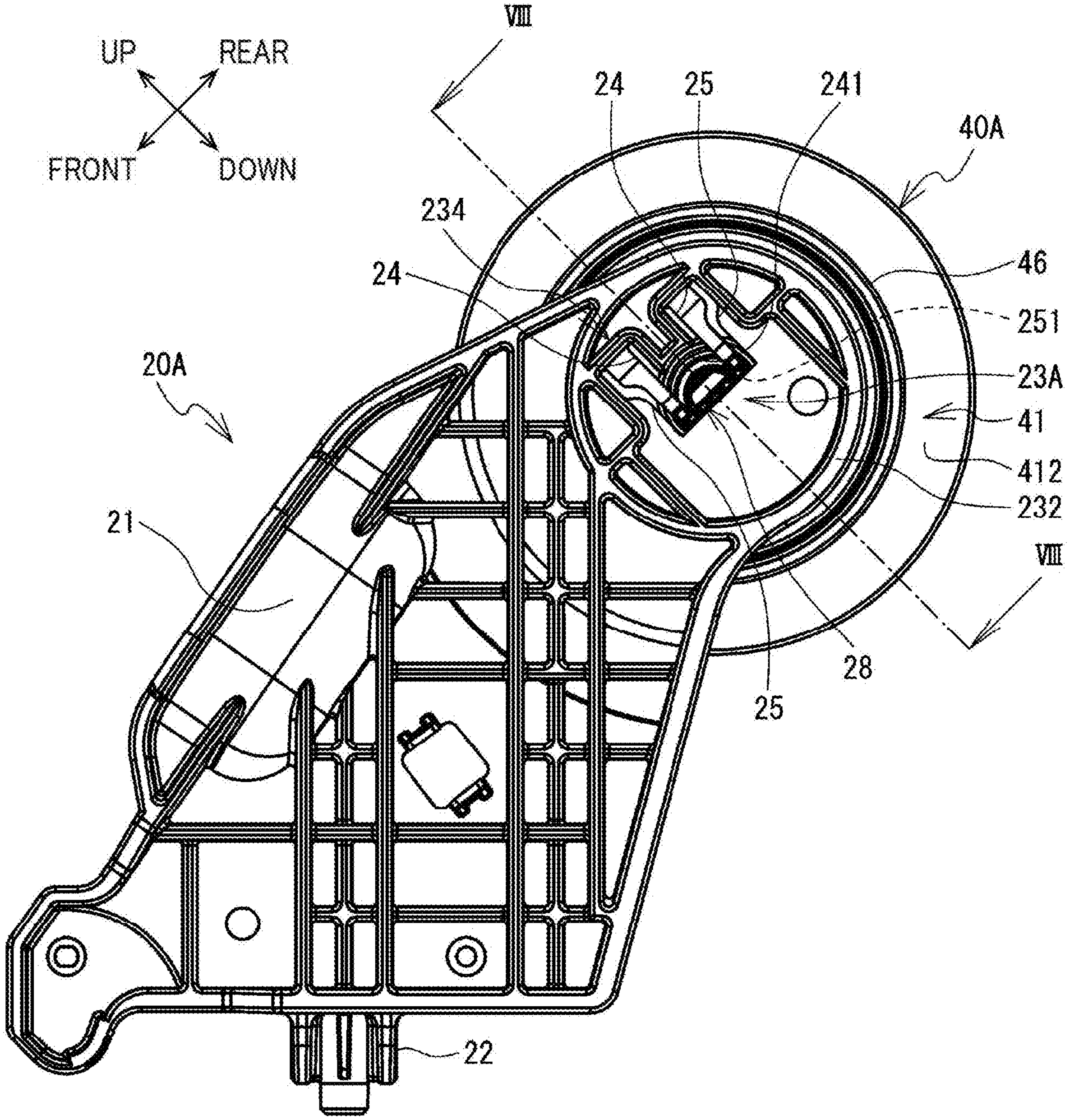
FIG. 6 is a right side view of a first adjuster 20A to which the first support member 40A is attached.

As illustrated in FIG. 6, the first adjuster 20A includes a base plate 21, a coupling part 22, and a mounting part 23A. The base plate 21 has a generally right-angled triangular shape in a side view. As illustrated in FIG. 5, the coupling part 22 has a plate-like shape extending leftward from a front lower end portion of the base plate 21. The coupling part 22 is fixed to the guide member 12. The first adjuster 20A is thus movable in the left-right direction together with the guide member 12.

Figure 8:
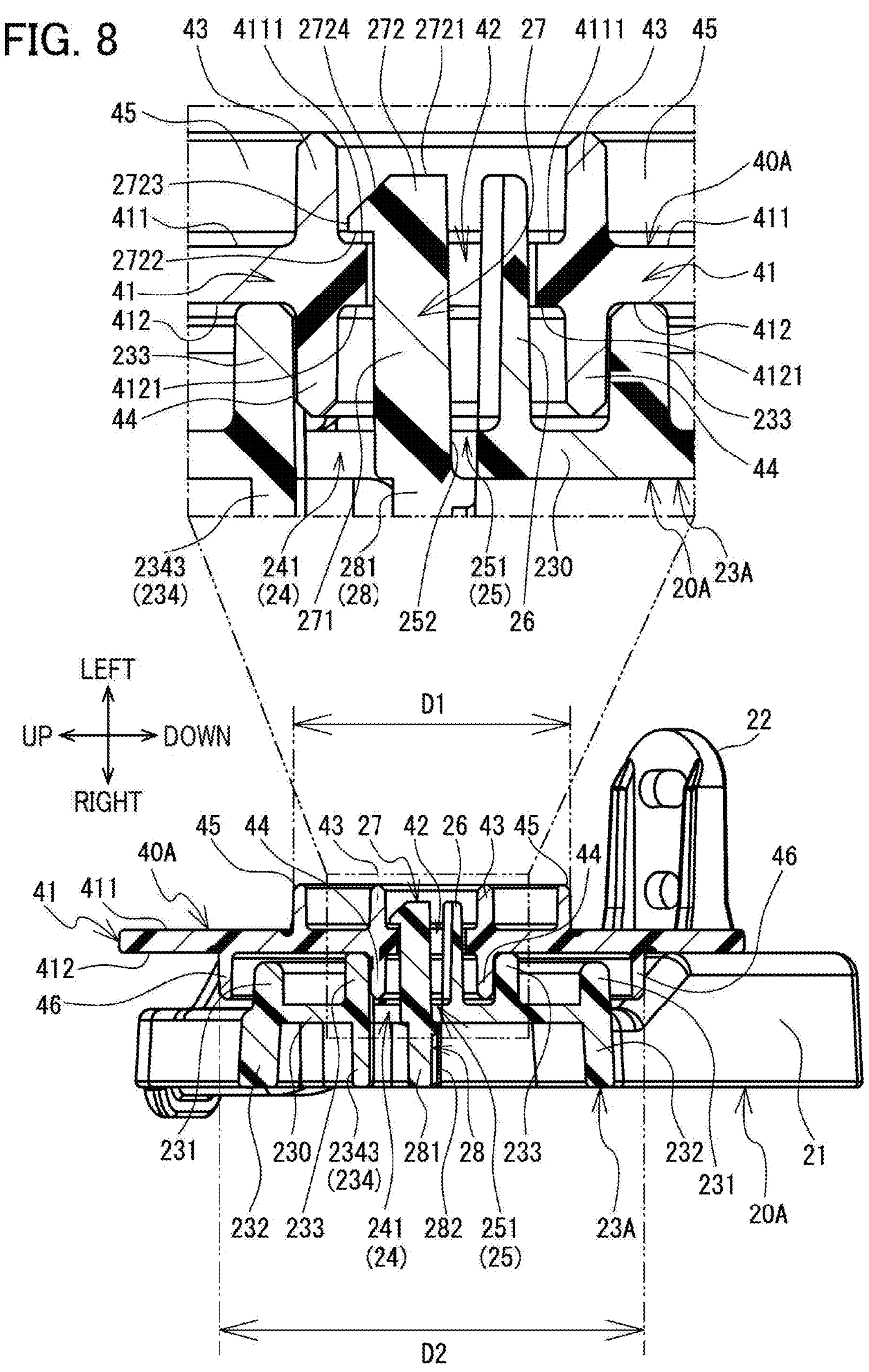
FIG. 8 is a cross-sectional view of the first adjuster 20A and the first support member 40A taken along a line VIII-VIII shown in FIG. 6 as viewed in a direction indicated by arrows in FIG. 6.

As illustrated in FIG. 6, the mounting part 23A is connected to an upper-rear end portion of the base plate 21. As illustrated in FIG. 8, the mounting part 23A includes a base plate 230, annular ribs 231, 232 and 233, a rib 234, an arcuate rib 26, a hook 27, and a lever 28. The mounting part 23A also has through-holes 24 and 25.

Figure 7:
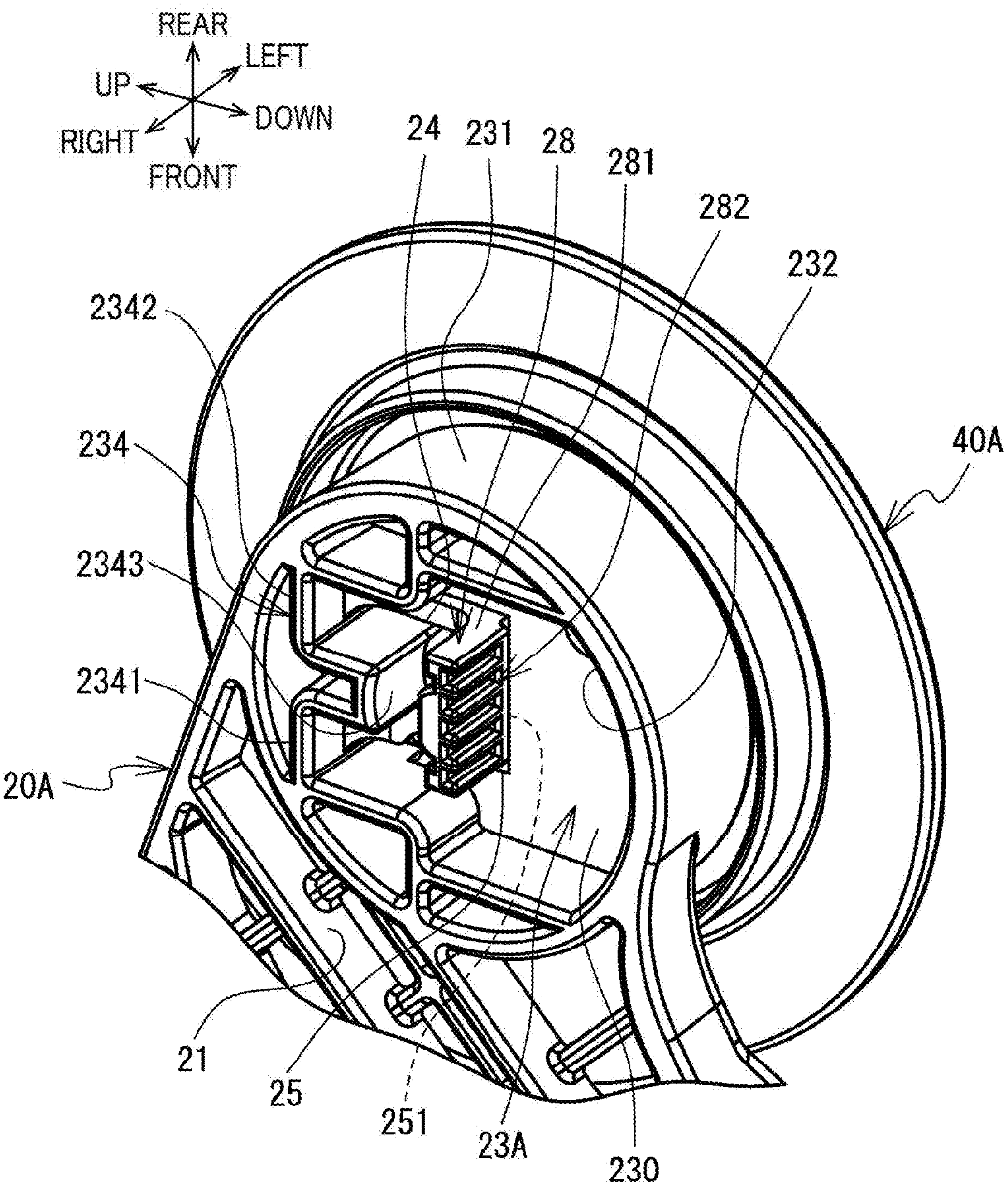
FIG. 7 is a perspective view of a mounting part 23A of the first adjuster 20A to which the first support member 40A is attached as viewed from a lower left rear side of the mounting part 23A.

The base plate 230 has a disc-like shape in a side view, as illustrated in FIGS. 6 and 7.

The annular rib 231 protrudes leftward from a peripheral edge on a left surface of the base plate 230, as illustrated in FIGS. 7 and 8. The annular rib 231 has an annular shape in a side view. The annular rib 232 protrudes rightward from a peripheral edge on a right surface of the base plate 230, as illustrated in FIG. 8. The annular rib 232 has an annular shape in a side view. The annular rib 232 has a right end that constitutes a right end of the mounting part 23A.

The annular rib 233 protrudes leftward from the left surface of the base plate 230. The annular rib 233 has an annular shape in a side view. The annular rib 233 has a left end that is positioned leftward of the left end of the annular rib 231. The annular ribs 231, 232 and 233 are coaxial with the base plate 230. That is, each of the annular ribs 231, 232 and 233 defines a radial center that is coincident with the radial center of the base plate 230. The annular rib 233 has an outer diameter that is smaller than an outer diameter of the annular rib 231. That is, the annular rib 233 is positioned radially inward of the annular rib 231. A notch (not illustrated) is formed in an upper front end portion of the annular rib 233, and another notch (not illustrated) is formed in an upper rear end portion of the annular rib 233.

As illustrated in FIGS. 6 and 7, each of the through-holes 24 and 25 has a U-shape that is open upward. The through-holes 24 and 25 penetrate through the base plate 230 in the left-right direction. The through-hole 25 is positioned to surround the through-hole 24 in a side view. The through-holes 24 and 25 are at positions overlapping with the pair of notches (not illustrated) formed in the annular rib 233 in the side view. The through-hole 24 has a lower peripheral end surface that is positioned above the radial center of the base plate 230. The through-hole 25 has a lower peripheral end surface that passes through the radial center of the base plate 230. The through-hole 25 has a lower end portion 251 defined by: the lower peripheral end surface; and a specific peripheral surface facing the lower peripheral end surface and positioned immediately above the lower peripheral end surface. The specific peripheral surface will be referred to as a specific part 252, hereinafter.

As illustrated in FIG. 8, the rib 234 protrudes rightward from the right surface of the base plate 230. The rib 234 has a right end that is aligned with the right end of the annular rib 232 in the left-right direction. The rib 234 includes extension parts 2341, 2342 and 2343. The extension part 2341 extends rearward from a front upper end portion of the annular rib 232. The extension part 2342 extends frontward from a rear upper end portion of the annular rib 232. The extension part 2343 has a U-shaped configuration in a side view that is configured of a first part extending downward from a rear end of the extension part 2341, a second part extending rearward from a lower end of the first part, and a third part extending upward from a rear end of the second part and connected to a front end of the extension part 2342. The extension part 2343 is positioned inside the through-hole 24 in a side view and defines a periphery of the through-hole 24. The extension part 2343 has a right end that is aligned with the right end of the annular rib 232 in the left-right direction.

As illustrated in FIG. 8, the arcuate rib 26 protrudes leftward from the left surface of the base plate 230. The arcuate rib 26 is positioned below the radial center of the base plate 230 in the up-down direction. The arcuate rib 26 defines the lower peripheral end surface of the lower end portion 251. The arcuate rib 26 extends in the left-right direction and has an arcuate shape that is curved downward in a side view. The arcuate rib 26 has a curvature of an imaginary circle such that a distance between the radial center of the base plate 230 and the arcuate rib 26 is a radius of the imaginary circle.

The hook 27 includes an extending part 271 and a pawl part 272. The extending part 271 extends leftward from the left surface of the base plate 230. The extending part 271 is positioned slightly above the radial center of the base plate 230, and is positioned between the lower peripheral end surface of the through-hole 24 and the lower peripheral end surface of the through-hole 25 in the up-down direction. The through-hole 24 has a lower end portion 241 that is defined by: the lower peripheral end surface positioned above the radial center of the base plate 230; and an opposing peripheral end surface positioned above the lower peripheral end surface. The extending part 271 defines the lower peripheral end surface of the lower end portion 241 of the through-hole 24 and the specific peripheral surface facing the lower peripheral end surface of the through-hole 25 and positioned immediately above the lower peripheral end surface of the through-hole 25. That is, the extending part 271 is positioned at the specific part 252. The extending part 271 is arrayed with the arcuate rib 26 in the up-down direction, and the extending part 271 is positioned above the arcuate rib 26.

The pawl part 272 is positioned on a left end of the extending part 271 and protrudes upward and leftward therefrom. The pawl part 272 has first through fourth end faces 2721, 2722, 2723, and 2724. The first end face 2721 and the second end face 2722 extend in a direction perpendicular to the left-right direction. The first end face 2721 constitutes a left end of the pawl part 272. The second end face 2722 constitutes an upper right surface of the pawl part 272. The second end face 2722 extends upward from an upper left end of the extending part 271. The second end face 2722 has an upper end that is positioned above the upper end of the first end face 2721.

The third end face 2723 extends leftward from the upper end of the second end face 2722. The third end face 2723 has a left end that is positioned rightward of the first end face 2721 and frontward of the front end of the first end face 2721. The fourth end face 2724 extends from the left end of the third end face 2723 to the upper end of the first end face 2721. The fourth end face 2724 is inclined diagonally downward and leftward. In other words, the fourth end face 2724 is inclined to extend rightward toward the upper end of the pawl part 272.

As illustrated in FIGS. 7 and 8, the lever 28 includes an extension part 281 and a plurality of ribs 282. The extension part 281 extends rightward from the right end of the extending part 271. The extension part 281 is in a form of a rectangular plate elongated in the front-rear direction in a plan view. That is, the extension part 281 protrudes rightward from the specific part 252. The extension part 281 has a right end that is aligned with the right end of the annular rib 232 in the left-right direction.

Each of the ribs 282 protrudes downward from a lower end of the extension part 281, and extends in the left-right direction in a bottom view. Each of the ribs 282 extends over an entire length in the left-right direction of the extension part 281. The ribs 282 are arrayed with one another in the front-rear direction. The ribs 282 are positioned rightward of the lower end portion 251 of the through-hole 25. The lower end portion 251 of the through-hole 25 is overlapped with the plurality of ribs 282 in a right side view (see FIG. 6).

The through-hole 24 is positioned above the hook 27, and the through-hole 25 is positioned below the hook 27. Hence, when the lever 28 is pulled upward, the right end portion of the lever 28 is pivotally moved upward about the specific part 252 (left end portion of the extension part 281) as a fulcrum, and the left end portion of the hook 27 is pivotally moved downward about the specific part 252 (right end portion of the extending part 271). When the hook 27 is pivotally moved downward, the third end face 2723 is positioned below an upper end of a support hole 42 (described later) of the first support member 40A (described later).

When the pulling up operation to the lever 28 is released, the right end portion of the lever 28 is pivotally moved downward about the specific part 252 toward an initial position thereof prior to the pulling up operation due to resiliency of the lever 28, and the hook 27 is pivotally moved upward about the specific part 252 toward an initial position thereof prior to the pulling up operation due to resiliency of the hook 27.

The second adjuster 30A has a structure that is symmetric with the structure of the first adjuster 20A with respect to the left-right direction, and hence, the structure of the second adjuster 30A will be briefly described.

Figure 9:
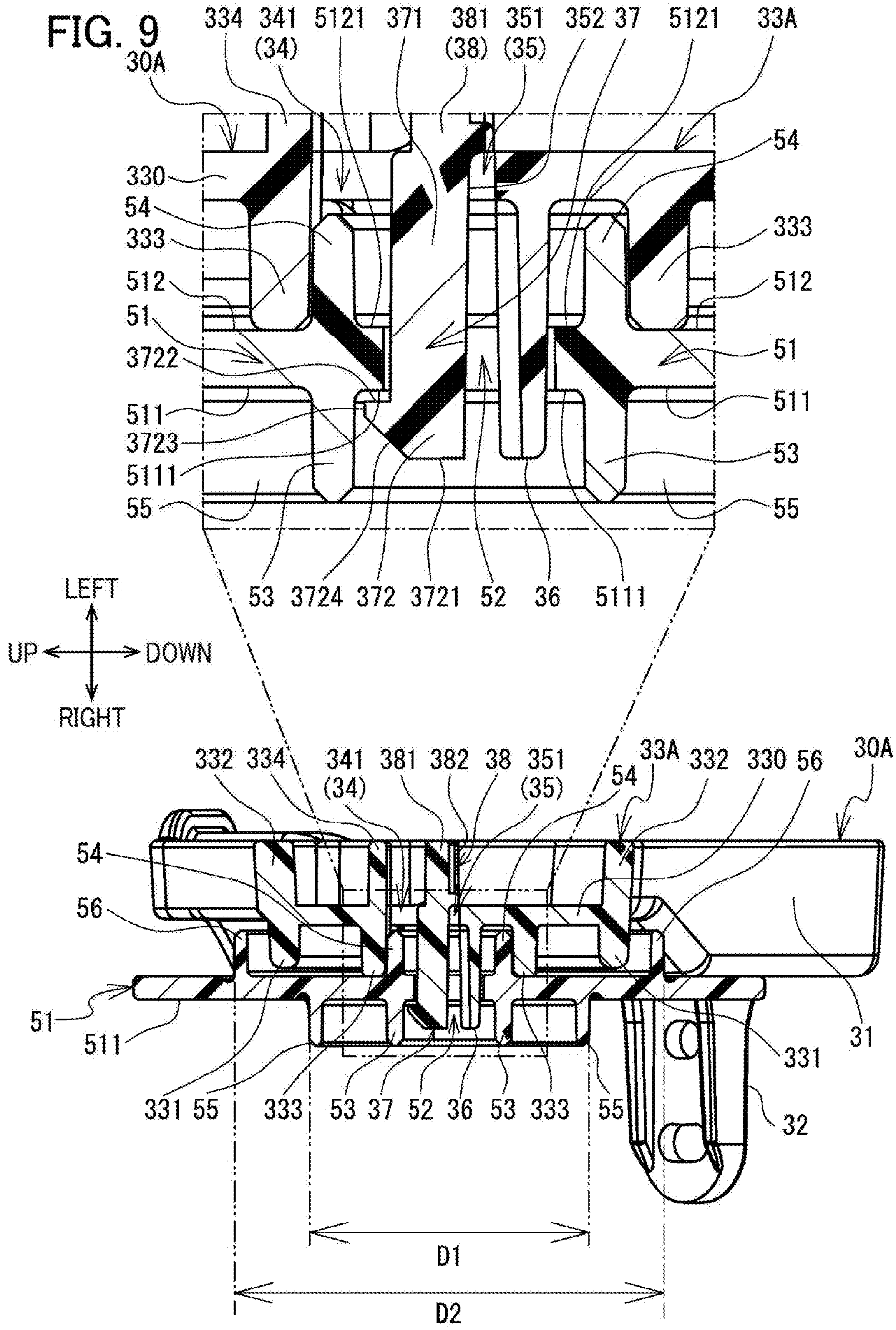
FIG. 9 is a cross-sectional view of a second adjuster 30A and the second support member 50A.

As illustrated in FIG. 9, the second adjuster 30A includes a base plate 31, a coupling part 32, and a mounting part 33A. The base plate 31, the coupling part 32, and the mounting part 33A have configurations corresponding to the configurations of the base plate 21, the coupling part 22, and the mounting part 23A of the first adjuster 20A, respectively. The coupling part 32 has a plate-like shape extending rightward from a front lower end portion of the base plate 31. The coupling part 32 is fixed to the guide member 13 of the support mechanism 10 by a male thread through a groove (not illustrated) formed in the housing cover 5. The second adjuster 30A is movable in the left-right direction together with the guide member 13.

As described above, the first adjuster 20A and the second adjuster 30A are configured to move away from each other in the left-right direction, since the rightward movement of the guide member 12 causes leftward movement of the guide member 13.

Reversely, the first adjuster 20A and the second adjuster 30A are configured to move toward each other, since the leftward movement of the guide member 12 causes rightward movement of the guide member 13. The positions of the guide members 12 and 13 are determined by the position of the nut 17. The position of the nut 17 can be changed by a user's operation to the operation part 162, and, hence, the positions of the first adjuster 20A and the second adjuster 30A in the left-right direction can be suitably adjusted.

The mounting part 33A is connected to an upper-rear end portion of the base plate 31. The mounting part 33A includes a base plate 330, annular ribs 331, 332 and 333, a rib 334, an arcuate rib 36, a hook 37, and a lever 38. The mounting part 33A also has through-holes 34 and 35. The base plate 330, the annular ribs 331, 332 and 333, the rib 334, the arcuate rib 36, the hook 37, the lever 38, and the through-holes 34 and 35 respectively have configurations corresponding to the configurations of the base plate 230, the annular ribs 231, 232 and 233, the rib 234, the arcuate rib 26, the hook 27, the lever 28, and the through-holes 24 and 25 of the mounting part 23A.

The annular rib 332 has a left end that constitutes the left end of the mounting part 33A. The left end of the annular rib 332, the left end of the rib 334, and the left end of the lever 38 are all aligned with each other in the left-right direction. The through-hole 35 has a lower end portion 351 defined by: the lower peripheral end surface; and a specific peripheral surface facing the lower peripheral end surface and positioned immediately above the lower peripheral end surface. The specific peripheral surface will be referred to as a specific part 352.

The hook 37 includes an extending part 371 and a pawl part 372. The extending part 371 and the pawl part 372 have configurations corresponding to the configurations of the extending part 271 and the pawl part 272 of the hook 27. The extending part 371 is positioned at the specific part 352, and extends rightward from the right surface of the base plate 330. That is, the hook 27 of the first adjuster 20A protrudes toward the second adjuster 30A, and the hook 37 of the second adjuster 30A protrudes toward the first adjuster 20A.

The pawl part 372 is positioned on a right end of the extending part 371 and protrudes upward and rightward. The pawl part 372 have first through fourth end faces 3721, 3722, 3723 and 3724 whose configurations correspond to the configurations of the first through fourth end faces 2721, 2722, 2723 and 2724 of the pawl part 272.

The first end face 3721 and the second end face 3722 extend in a direction perpendicular to the left-right direction. The first end face 3721 constitutes a right end of the pawl part 372. The second end face 3722 constitutes an upper left end of the pawl part 372. The second end face 3722 extends upward from an upper right end of the extending part 371. The third end face 3723 extends rightward from an upper end of the second end face 3722. The fourth end face 3724 extends from the right end of the third end face 3723 to the upper end of the first end face 3721. The fourth end face 3724 is inclined diagonally downward and rightward.

The lever 38 includes an extension part 381 and a plurality of ribs 382. The extension part 381 and the plurality of ribs 382 have configurations corresponding to the configurations of the extension part 281 and the plurality of ribs 282 of the lever 28. The through-hole 34 is positioned above the hook 37, and the through-hole 35 is positioned below the hook 37. Hence, when the lever 38 is pulled upward, the left end portion of the lever 28 is pivotally moved upward about the specific part 352 (right end portion of the extension part 381) as a fulcrum, and the right end portion of the hook 37 is pivotally moved downward about the specific part 352 (left end portion of the extending part 371). When the hook 37 is pivotally moved downward, the third end face 3723 is positioned below an upper end of a support hole 52 (described later) of the second support member 50A (described later).

When the pulling up operation to the lever 38 is released, the left end portion of the lever 38 is pivotally moved downward about the specific part 352 toward an initial position thereof prior to the pulling up operation due to resiliency of the lever 38, and the hook 37 is pivotally moved upward about the specific part 352 toward an initial position thereof prior to the pulling up operation due to resiliency of the hook 37.

A structure of the first support member 40A will next be described with reference to FIGS. 5 and 8.

The first support member 40A is configured to support the tape roll M (see FIG. 3) in cooperation with the second support member 50A (see FIG. 2) described later. The first support member 40A is attachable to and detachable from the mounting part 23A of the first adjuster 20A (see FIGS. 4 and 5).

As illustrated in FIG. 8, the first support member 40A includes a support plate part 41 and a plurality of protruding parts 43, 44, 45 and 46. The support plate part 41 also has the above-mentioned support hole 42.

The support plate part 41 has a disc-like shape in a side view. The support plate part 41 has an outer diameter that is greater than an outer diameter of the base plate 230. The support plate part 41 is concentric with the base plate 230 in a state where the first support member 40A is attached to the mounting part 23A.

The support plate part 41 has a first surface 411 and a second surface 412. The first surface 411 and the second surface 412 are a pair of opposite surfaces of the support plate part 41 extending in a direction perpendicular to an axial direction of the support plate part 41. That is, the first surface 411 and the second surface 412 face in opposite directions from each other. In FIG. 5, the first surface 411 faces rightward, whereas the second surface 412 faces leftward. In FIG. 8, the first surface 411 faces leftward, whereas the second surface 412 faces rightward. As such, the support plate part 41 is arranged such that the first surface 411 and the second surface 412 extend perpendicularly to the left-right direction and face in opposite directions from each other in the left-right direction.

As illustrated in FIG. 8, the support hole 42 penetrates through the support plate part 41 in the left-right direction from the first surface 411 to the second surface 412. The support hole 42 is a circular hole whose axis extends in the left-right direction. The axis of the support hole 42 is coincident with the axis of the support plate part 41 in a side view. The support hole 42 has an inner diameter that is substantially equal to a distance from the upper end of the extending part 271 to the lower end of the arcuate rib 26. The third end face 2723 of the hook 27 is positioned above the support hole 42 in the state where the first support member 40A is attached to the mounting part 23A.

The protruding part 43 is in a form of an annular rib (in a side view) protruding from the first surface 411 of the support plate part 41. The protruding part 43 is concentric with the support plate part 41 in the side view. The protruding part 43 has an inner diameter that is greater than the inner diameter of the support hole 42. That is, the protruding part 43 is positioned radially outward of the support hole 42 to surround the support hole 42 in the side view. The first surface 411 includes a first engagement surface 4111 positioned radially outward of the support hole 42 and radially inward of the protruding part 43. Since the first surface 411 extends perpendicularly to the left-right direction, the first engagement surface 4111 also extends perpendicularly to the left-right direction.

The protruding part 44 is in a form of an annular rib (in a side view) protruding from the second surface 412 of the support plate part 41. The protruding part 44 is concentric with the support plate part 41 in the side view. The protruding part 44 has an inner diameter equal to the inner diameter of the protruding part 43. Hence, the protruding part 44 is positioned radially outward of the support hole 42 to surround the support hole 42 in the side view. The protruding part 44 is aligned with the protruding part 43 in the left-right direction. The second surface 412 includes a second engagement surface 4121 positioned radially outward of the support hole 42 and radially inward of the protruding part 44. Since the second surface 412 extends perpendicularly to the left-right direction, the second engagement surface 4121 also extends perpendicularly to the left-right direction.

The protruding part 45 is in a form of an annular rib (in a side view) protruding from the first surface 411 of the support plate part 41. The protruding part 45 is concentric with the support plate part 41 in the side view. The protruding part 45 surrounds the through-hole 25 in the support plate part 41. The protruding part 45 has an outer diameter D1 that is greater than an outer diameter of the protruding part 43. Hence, the protruding part 45 is positioned radially outward of the protruding part 43 to surround the protruding part 43 in a side view. The outer diameter D1 of the protruding part 45 is equal to an inner diameter of the sleeve N1 of the roll M1. Accordingly, the protruding part 45 can be inserted in and fitted in the sleeve N1. The outer diameter D1 of the protruding part 45 is smaller than an inner diameter of the annular rib 231. The protruding part 45 is positioned inward of the annular rib 231 in the state where the first support member 40A is attached to the mounting part 23A, as illustrated in FIG. 8.

The protruding part 46 is in a form of an annular rib (in a side view) protruding from the second surface 412 of the support plate part 41. The protruding part 46 is concentric with the support plate part 41 in the side view. The protruding part 46 surrounds the through-hole 25 in the support plate part 41. The protruding part 46 has an outer diameter D2 that is greater than the outer diameter D1 of the protruding part 44. Hence, the protruding part 46 is positioned radially outward of the protruding part 44 to surround the protruding part 44 in the side view (although the protruding part 44 is provided on the first surface 411). The outer diameter D2 of the protruding part 46 is equal to an inner diameter of the sleeve N2 of the roll M2. Hence, the protruding part 46 can be inserted in and fitted in the sleeve N2. Further, since the inner diameter of the sleeve N2 is greater than the inner diameter of the sleeve N1, the protruding part 46 is positioned radially outward of the protruding part 45 on the support plate part 41. The outer diameter D2 of the protruding part 46 is greater than the outer diameter of the annular rib 231. The protruding part 46 is positioned radially outward of the annular rib 231 in the state where the first support member 40A is attached to the mounting part 23A.

For supporting the roll M1 by the support mechanism 10, the support plate part 41 of the first support member 40A is attached to the first adjuster 20A in such a manner that the first surface 411 of the support plate part 41 faces leftward and the second surface 412 of the support plate part 41 faces rightward, as illustrated in FIG. 8, so that the first surface 411 faces the second adjuster 30A in the left-right direction. This posture of the first support member 40A will be referred to as a "posture 1A". The protruding part 45 is fitted in the sleeve N1 of the roll M1 in a state where the first support member 40A is attached to the first adjuster 20A with the posture 1A.

For supporting the roll M2 by the support mechanism 10, the support plate part 41 of the first support member 40A is attached to the first adjuster 20A in such a manner that the second surface 412 faces leftward and the first surface 411 faces rightward, as illustrated in FIG. 5, so that the second surface 412 faces the second adjuster 30A in the left-right direction. This posture of the first support member 40A will be referred to as a "posture 1B". The protruding part 46 is fitted in the sleeve N2 of the roll M2 in a state where the first support member 40A is attached to the first adjuster 20A with the posture 1B.

Next, attachment and detachment of the first support member 40A to and from the mounting part 23A will be described with reference to FIG. 8.

Firstly, attachment of the first support member 40A in the posture 1A to the mounting part 23A will be described. For attaching the first support member 40A to the mounting part 23A in the posture 1A, a user moves the first support member 40A rightward such that the first support member 40A in the posture 1A approaches the mounting part 23A. At this time, the user aligns the radial center of the support plate part 41 with the radial center of the base plate 230 in the side view.

As the first support member 40A is further moved rightward toward the mounting part 23A to have the second surface 412 further approach the mounting part 23A, the fourth end face 2724 of the pawl part 272 comes into abutment with the lower end of the second engagement surface 4121. Since the fourth end face 2724 is inclined rightward toward the upper end of the fourth end face 2724, the fourth end face 2724 in abutment with the second engagement surface 4121 receives downward reaction from the second engagement surface 4121. Hence, in accordance with rightward movement of the first support member 40A, the fourth end face 2724 slidingly moves with respect to the lower end of the second engagement surface 4121, and the hook 27 is resiliently deformed downward such that the extending part 271 is pivotally moved downward about the specific part 252 (right end of the extending part 271). In other words, the left end portion of the hook 27 is moved downward by the resilient deformation of the hook 27. At this time, the third end face 2723 is positioned inside the support hole 42, so that the hook 27 and the arcuate rib 26 can be inserted in the support hole 42 to pass therethrough.

At a time when the hook 27 moves past the support hole 42 to allow the pawl part 272 to be positioned leftward of the support hole 42, and the hook 27 pivotally and resiliently moves upward to restore its original shape, and hence, the third end face 2723 is positioned upward of the support hole 42. As a result, the second end face 2722 and the first engagement surface 4111 are engaged with each other in the left-right direction, thereby completing attachment of the first support member 40A in the posture 1A to the mounting part 23A. Due to the engagement between the second end face 2722 and the first engagement surface 4111, unexpected disengagement of the first support member 40A from the mounting part 23A can be restrained.

For detaching the first support member 40A having the posture 1A from the mounting part 23A, a user pulls the lever 28 upward. In accordance with the upward pivotal movement of the right end portion of the lever 28 about the specific part 252, the left end portion of the hook 27 is pivotally moved downward about the specific part 252. Hence, the third end face 2723 is brought to the position radially inward of the support hole 42 in a plan view. The user moves the first support member 40A leftward while the user continues to pull up the lever 28, the hook 27 and the arcuate rib 26 can be pulled out through the support hole 42, thereby completing detachment of the first support member 40A from the mounting part 23A.

Next, attachment of the first support member 40A with its posture 1B to the mounting part 23A will be described.

This attachment process is generally the same as the attachment process for the first support member 40A with the posture 1A. Hereinafter, the difference between the process of attaching the first support member 40A with its posture 1B and the process of attaching the first support member 40A with its posture 1A will be mainly described.

For attaching the first support member 40A to the mounting part 23A with the posture 1B, a user moves the first support member 40A rightward such that the first support member 40A in the posture 1B approaches the mounting part 23A. Hence, the fourth end face 2724 of the pawl part 272 comes into abutment with the lower end of the first engagement surface 4111 (at this time, the first support member 40A illustrated in FIG. 8 is turned upside down). As the user moves the first support member 40A further rightward, the fourth end face 2724 slidingly moves with respect to the lower end of the first engagement surface 4111, and the hook 27 is resiliently deformed downward. Accordingly, the third end face 2723 is positioned inside the support hole 42, so that the hook 27 and the arcuate rib 26 can extend through the support hole 42.

At a time when the hook 27 moves past the support hole 42, the pawl part 272 is positioned leftward of the support hole 42, and the hook 27 pivotally and resiliently moves upward to restore its original shape, and hence, the third end face 2723 is positioned upward of the support hole 42. As a result, the second end face 2722 and the second engagement surface 4121 are engaged with each other in the left-right direction, thereby completing attachment of the first support member 40A having the posture 1B to the mounting part 23A, as illustrated in FIG. 5. Due to the engagement between the second end face 2722 and the second engagement surface 4121, unexpected disengagement of the first support member 40A from the mounting part 23A can be restrained.

For detaching the first support member 40A having the posture 1B from the mounting part 23A, a user pulls the lever 28 upward. The user moves the first support member 40A leftward in a state where the third end face 2723 is positioned inside the support hole 42. Hence, the hook 27 and the arcuate rib 26 can be moved past the support hole 42, thereby completing detachment of the first support member 40A from the mounting part 23A.

The second support member 50A has a similar structure to the first support member 40A, and therefore, the second support member 50A will be briefly described next.

Figure 4:
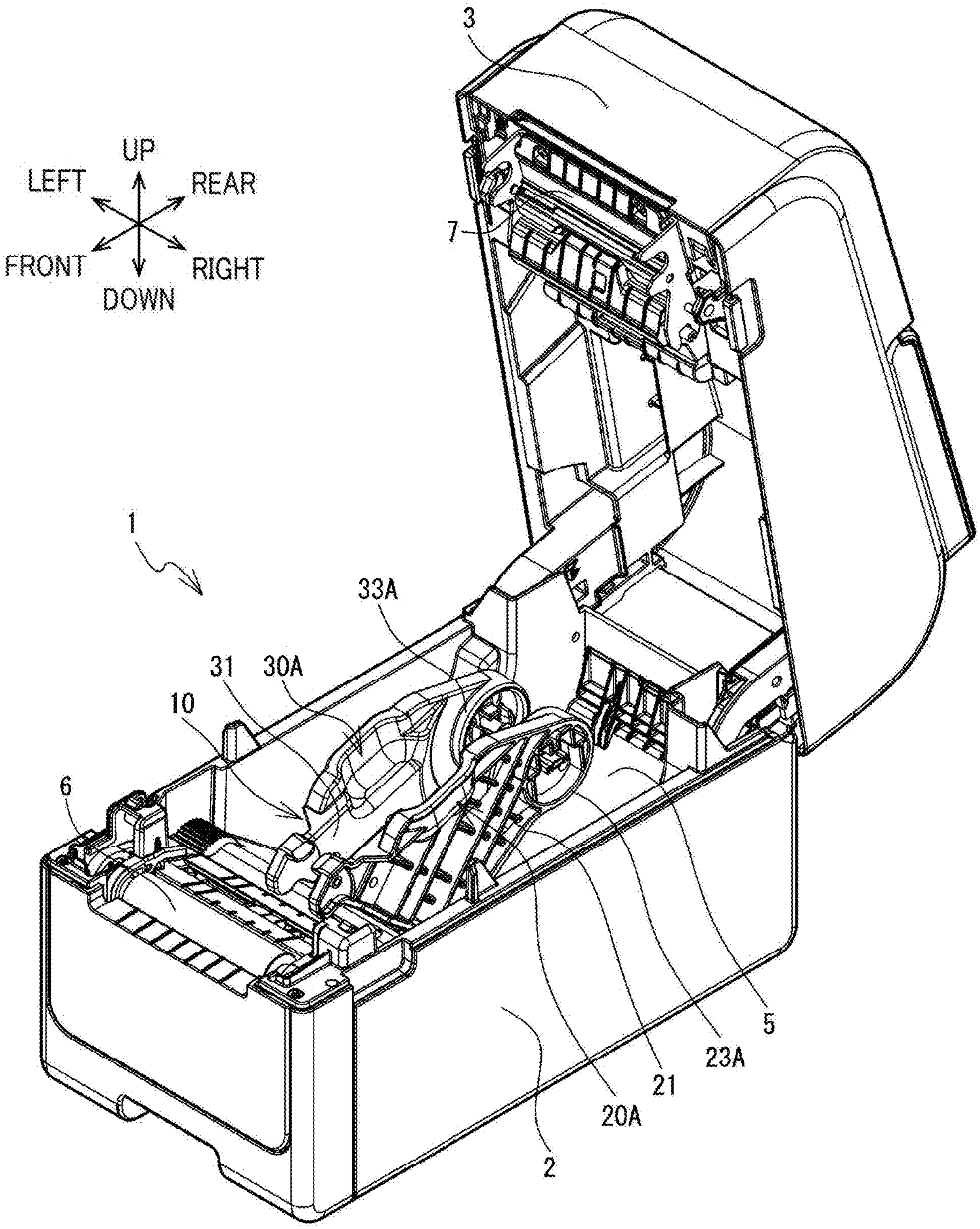
FIG. 4 is a perspective view of the printer 1 as viewed from the upper right front side thereof in a state where a first support member 40A and a second support member 50A are detached and the cover 3 is opened.

The second support member 50A is attachable to and detachable from the mounting part 33A of the second adjuster 30A (see FIGS. 4 and 5). As illustrated in FIG. 9, the second support member 50A includes a support plate part 51, and a plurality of protruding parts 53, 54, 55 and 56. The support plate part 51 has the above-mentioned support hole 52. The support plate part 51, the plurality of protruding parts 53, 54, 55 and 56, and the support hole 52 have configurations corresponding to the configurations of the support plate part 41, the plurality of protruding parts 43, 44, 45 and 46, and the support hole 42 of the first support member 40A.

The support plate part 51 has a first surface 511 and a second surface 512. The first surface 511 and the second surface 512 correspond to the first surface 411 and the second surface 412 of the support plate part 41, respectively. In FIG. 5, the first surface 511 faces leftward, and second surface 512 faces rightward. In FIG. 9, the first surface 511 faces rightward, while the second surface 512 faces leftward. As such, the support plate part 51 is arranged such that the first surface 511 and the second surface 512 extend perpendicularly to the left-right direction and face in opposite directions from each other in the left-right direction.

Referring to FIG. 9, the first surface 511 includes a first engagement surface 5111 positioned radially outward of the support hole 52 and radially inward of the protruding part 53. The second surface 512 includes a second engagement surface 5121 positioned radially outward of the support hole 52 and radially inward of the protruding part 54.

The protruding part 55 has the outer diameter D1 equal to the inner diameter of the sleeve N1 of the roll M1. Hence, the protruding part 55 can be inserted in and fitted in the sleeve N1. The protruding part 56 has the outer diameter D2 equal to the inner diameter of the sleeve N2 of the roll M2. Hence, the protruding part 56 can be inserted in and fitted in the sleeve N2.

For supporting the roll M1 by the support mechanism 10, the support plate part 51 of the second support member 50A is attached to the second adjuster 30A in such a manner that the first surface 511 of the support plate part 51 faces rightward and the second surface 512 of the support plate part 51 faces leftward, as illustrated in FIG. 9, so that the first surface 511 faces the first adjuster 20A in the left-right direction, as illustrated in FIG. 2. This posture of the second support member 50A will be referred to as a "posture 2A". In the support mechanism 10, a combination of the first support member 40A having the posture 1A and the second support member 50A having the posture 2A supports the roll M1.

For supporting the roll M2 by the support mechanism 10, the support plate part 51 of the second support member 50A is attached to the second adjuster 30A in such a manner that the second surface 512 faces rightward and the first surface 511 faces leftward, so that the second surface 512 faces the first adjuster 20A in the left-right direction, as illustrated in FIG. 5. This posture of the second support member 50A will be referred to as a "posture 2B". In the support mechanism 10, a combination of the first support member 40A having the posture 1B and the second support member 50A having the posture 2B supports the roll M2.

A process of attaching and detaching the second support member 50A to and from the mounting part 33A is the same as the process of attaching and detaching the first support member 40A to and from the mounting part 23A.

For attaching the second support member 50A to the mounting part 33A, a user moves the second support member 50A leftward such that the second support member 50A having the posture 2A or the posture 2B to approach the mounting part 33A. Hence, the fourth end face 3724 of the pawl part 372 comes into abutment with the lower end of the first engagement surface 5111 or the lower end of the second engagement surface 5121. In accordance with further leftward movement of the second support member 50A, the fourth end face 3724 slidingly moves with respect to the lower end of the first engagement surface 5111 or the second engagement surface 5121, and the hook 37 is further resiliently deformed downward. Accordingly, the third end face 3723 is positioned inside the support hole 52, so that the hook 37 and the arcuate rib 36 can extend through the support hole 52.

At a time when the hook 37 moves past the support hole 52, the pawl part 372 is positioned rightward of the support hole 52, and the hook 37 pivotally and resiliently moves upward to restore its original shape. When the second support member 50A in the posture 2A is attached to the mounting part 33A, the second end face 3722 and the first engagement surface 5111 are engaged with each other in the left-right direction. When the second support member 50A in the posture 2B is attached to the mounting part 33A, the second end face 3722 and the second engagement surface 5121 are engaged with each other in the left-right direction. The attachment of the second support member 50A to the mounting part 33A is completed upon such engagement.

For detaching the second support member 50A from the mounting part 33A, a user pulls the lever 38 upward. The user moves the second support member 50A rightward in a state where the third end face 3723 is positioned inside the support hole 52 in a side view. Hence, the hook 37 and the arcuate rib 36 can be moved past the support hole 52, thereby completing the detachment of the second support member 50A from the mounting part 33A.

The printer 1 according to the above-described embodiment exhibits advantageous functions and effects as described below.

The support mechanism 10 of the printer 1 includes the first adjuster 20A, the second adjuster 30A, the first support member 40A, and the second support member 50A. The first adjuster 20A includes the hook 27, and the second adjuster 30A includes the hook 37. The hook 27 of the first adjuster 20A protrudes leftward toward the second adjuster 30A, and the hook 37 of the second adjuster 30A protrudes rightward toward the first adjuster 20A.

The first support member 40A includes the support plate part 41 and the protruding parts 45 and 46, and has the support hole 42. The support plate part 41 has the first surface 411 and the second surface 412. The support hole 42 penetrates through the support plate part 41 from the first surface 411 to the second surface 412. The protruding part 45 protrudes from the first surface 411 of the support plate part 41. The outer diameter D1 of the protruding part 45 is equal to the inner diameter of the sleeve N1. The protruding part 46 protrudes from the second surface 412 of the support plate part 41. The outer diameter D2 of the protruding part 46 is equal to the inner diameter of the sleeve N2. The protruding part 45 is fitted in the sleeve N1 of the roll M1 in the state where the first support member 40A having the posture 1A is attached to the first adjuster 20A. The protruding part 46 is fitted in the sleeve N2 of the roll M2 in the state where the first support member 40A having the posture 2A is attached to the first adjuster 20A.

The second support member 50A includes the support plate part 51 and the protruding parts 55 and 56, and has the support hole 52. The support plate part 51 has the first surface 511 and the second surface 512. The support hole 52 penetrates through the support plate part 51 from the first surface 511 to the second surface 512. The protruding part 55 protrudes from the first surface 511 of the support plate part 51. The protruding part 55 surrounds the support hole 52 in the support plate part 51. The outer diameter D1 of the protruding part 55 is equal to the inner diameter of the sleeve N1. The protruding part 56 protrudes from the second surface 512 of the support plate part 51. The protruding part 56 surrounds the support hole 52 in the support plate part 51. The outer diameter D2 of the protruding part 56 is equal to the inner diameter of the sleeve N2. The protruding part 55 is fitted in the sleeve N1 of the roll M1 in the state where the second support member 50A having the posture 2A is attached to the second adjuster 30A. The protruding part 56 is fitted in the sleeve N2 of the roll M2 in the state where the second support member 50A having the posture 2B is attached to the second adjuster 30A.

In this case, the first support member 40A is securely attached to the first adjuster 20A by the hook 27, and the second support member 50A is securely attached to the second adjuster 30A by the hook 37. The roll M1 is supported by the first support member 40A having the posture 1A and the second support member 50A having the posture 2A. The roll M2 is supported by the first support member 40A having the posture 1B and the second support member 50A having the posture 2B. A user can detach the first support member 40A from the first adjuster 20A by pulling the hook 27 off the support hole 42, and the user can attach the first support member 40A having the posture 1A or the posture 1B to the first adjuster 20A by inserting the inserting the hook 27 into the support hole 42. Further, a user can detach the second support member 50A from the second adjuster 30A by pulling the hook 37 off the support hole 52, and the user can attach the second support member 50A having the posture 2A or the posture 2B to the second adjuster 30A by inserting the hook 37 into the support hole 52. In this way, the printer 1 can securely support the roll medium M, and can contribute to selective and easy support of the roll M1 and roll M2 whose inner diameters are different from each other.

The base plate 230 of the mounting part 23A has the through-hole 25. The extending part 271 of the hook 27 protrudes leftward from the specific part 252 of the through-hole 25. The extension part 281 of the lever 28 protrudes rightward from the specific part 252. The base plate 330 of the mounting part 33A has the through-hole 35. The extending part 371 of the hook 37 protrudes rightward from the specific part 352 of the through-hole 35. The extension part 381 of the lever 38 protrudes leftward from the specific part 352. With this structure, the hook 27 is deformed (pivotally moved downward) by the user's operation to the lever 28. The hook 37 is deformed (pivotally moved downward) by the user's operation to the lever 38. Hence, a user can easily detach the first support member 40A and the second support member 50A from the first adjuster 20A and the second adjuster 30A, respectively. Accordingly, the printer 1 can contribute to easy detachment of the first support member 40A and the second support member 50A from the first adjuster 20A and the second adjuster 30A, respectively.

In the mounting part 23A of the first adjuster 20A, the annular rib 232 protrudes rightward from the right surface of the base plate 230. The right end of the extension part 281 of the lever 28 is aligned with the right end of the annular rib 232 in the left-right direction. In the mounting part 33A of the second adjuster 30A, the annular rib 332 protrudes leftward from the left surface of the base plate 330. The left end of the extension part 381 of the lever 38 is aligned with the left end of the annular rib 332 in the left-right direction. In this case, the lever 28 does not protrude further rightward relative to the annular rib 232, and the lever 38 does not protrude further leftward relative to the annular rib 332. With this structure, the levers 28 and 38 are less like to be operated unexpectedly. Thus, the printer 1 can contribute to suppression of unexpected detachment of the support members 40A and 50A from the adjusters 20A and 30A.

The hook 27 includes the extending part 271 and the pawl part 272. The extending part 271 extends leftward from the left surface of the base plate 230. The pawl part 272 is positioned on the left end of the pawl part 272 to protrude upward and leftward therefrom. The pawl part 272 has the second end face 2722 extending in a direction perpendicular to the left-right direction. The support plate part 41 of the first support member 40A has the first engagement surface 4111 and the second engagement surface 4121 both of which extend in the direction perpendicular to the left-right direction. The second end face 2722 and the first engagement surface 4111 are engaged with each other in the left-right direction in the state where the first support member 40A having the posture 1A is attached to the first adjuster 20A. The second end face 2722 and the second engagement surface 4121 are engaged with each other in the left-right direction in the state where the first support member 40A having the posture 1B is attached to the first adjuster 20A.

The hook 37 includes the extending part 371 and the pawl part 372. The extending part 371 extends rightward from the right surface of the base plate 330. The pawl part 372 is positioned on the right end of the pawl part 372 to protrude upward and leftward therefrom. The pawl part 372 has the second end face 3722 extending in the direction perpendicular to the left-right direction. The support plate part 51 of the second support member 50A has the first engagement surface 5111 and the second engagement surface 5121 both of which extend in the direction perpendicular to the left-right direction. The second end face 3722 and the first engagement surface 5111 are engaged with each other in the left-right direction in the state where the second support member 50A having the posture 2A is attached to the second adjuster 30A. The second end face 3722 and the second engagement surface 5121 are engaged with each other in the left-right direction in the state where the second support member 50A having the posture 2B is attached to the second adjuster 30A.

With this structure, the first support member 40A cannot be detached from the first adjuster 20A due to the engagement between the second end face 2722 and the first engagement surface 4111 or the second engagement surface 4121 as long as the user does not operate the lever 28. Further, the second support member 50A cannot be detached from the second adjuster 30A due to the engagement between the second end face 3722 and the first engagement surface 5111 or the second engagement surface 5121 as long as the user does not operate the lever 38. Hence, unexpected detachment of the first support member 40A and the second support member 50A from the respective mounting part 23A and mounting part 33A can be restrained. Accordingly, the printer 1 can contribute to the suppression of unexpected detachment of the first support member 40A and the second support member 50A from the mounting part 23A and the mounting part 33A, respectively.

Further, the pawl part 272 has the fourth end face 2724 that is inclined rightward toward the upper end of the fourth end face 2724. The pawl part 372 has the fourth end face 3724 that is inclined leftward toward the upper end of the fourth end face 3724. In the process of attaching the first support member 40A to the first adjuster 20A, the first support member 40A is brought into abutment with the fourth end face 2724. Due to this abutment, the hook 27 is resiliently deformed and bent, thereby facilitating attachment of the first support member 40A to the first adjuster 20A. In the process of attaching the second support member 50A to the second adjuster 30A, the second support member 50A is brought into abutment with the fourth end face 3724. Hence, the hook 37 is resiliently deformed and bent, thereby facilitating attachment of the second support member 50A to the second adjuster 30A. In this way, the printer 1 can contribute to easy attachment of the first support member 40A and second support member 50A to the respective first adjuster 20A and second adjuster 30A.

In the above-described embodiment, the printer 1 is an example of a printer of the present disclosure. The tape medium P is an example of a first elongated printing medium and a second elongated printing medium of the disclosure. The roll M1 is an example of a first roll of the disclosure. The roll M2 is an example of a second roll of the disclosure. The sleeve N1 is an example of a first sleeve of the first roll of the disclosure. The sleeve N2 is an example of a second sleeve of the second roll of the disclosure. The housing 2 is an example of a housing of the present disclosure. The upward direction is an example of a first direction of the disclosure. The left-right direction is an example of a second direction of the disclosure. The first adjuster 20A is an example of a first adjuster of the disclosure. The second adjuster 30A is an example of a second adjuster of the disclosure. The first support member 40A is an example of a first support member of the disclosure. The second support member 50A is an example of a second support member of the disclosure. The hook 27 is an example of a first hook of the disclosure. The hook 37 is an example of a second hook of the disclosure. The support plate part 41 is an example of a first support plate part of the disclosure. The support hole 42 is an example of a first support hole of the disclosure. The first surface 411 is an example of a first surface of the first support plate part of the disclosure, and the second surface 412 is an example of a second surface of the first support plate part of the disclosure. The protruding part 45 is an example of a first protruding part of the first support member of the disclosure. The protruding part 46 is an example of a second protruding part of the first support member of the disclosure. The support plate part 51 is an example of a second support plate part of the disclosure. The support hole 52 is an example of a second support hole of the disclosure. The first surface 511 is an example of a first surface of the second support plate part of the disclosure, and the second surface 512 is an example of a second surface of the second support plate part of the disclosure. The protruding part 55 is an example of a first protruding part of the second support member of the disclosure. The protruding part 56 is an example of a second protruding part of the second support member of the disclosure.

The base plate 230 is an example of a first base plate of the first adjuster of the disclosure. The through-hole 25 is an example of a first through-hole of the first base plate of the disclosure. The lever 28 is an example of a first lever of the disclosure. The specific part 252 is an example of a first specific part of the disclosure. The base plate 330 is an example of a second base plate of the second adjuster of the disclosure. The through-hole 35 is an example of a second through-hole of the second base plate of the disclosure. The lever 38 is an example of a second lever of the disclosure. The specific part 352 is an example of a second specific part of the disclosure. The annular rib 232 is an example of a first rib of the disclosure. The annular rib 332 is an example of a second rib of the disclosure. The extending part 271 is an example of a first extending part of the first hook of the disclosure. The pawl part 272 is an example of a first pawl part of the first hook of the disclosure. The fourth end face 2724 is an example of a first guide surface if the first pawl part of the disclosure. The extending part 371 is an example of a second extending part of the second hook of the disclosure. The pawl part 372 is an example of a second pawl part of the second hook of the disclosure. The fourth end face 3724 is an example of a second guide surface of the second pawl part of the disclosure.

Figure 10:
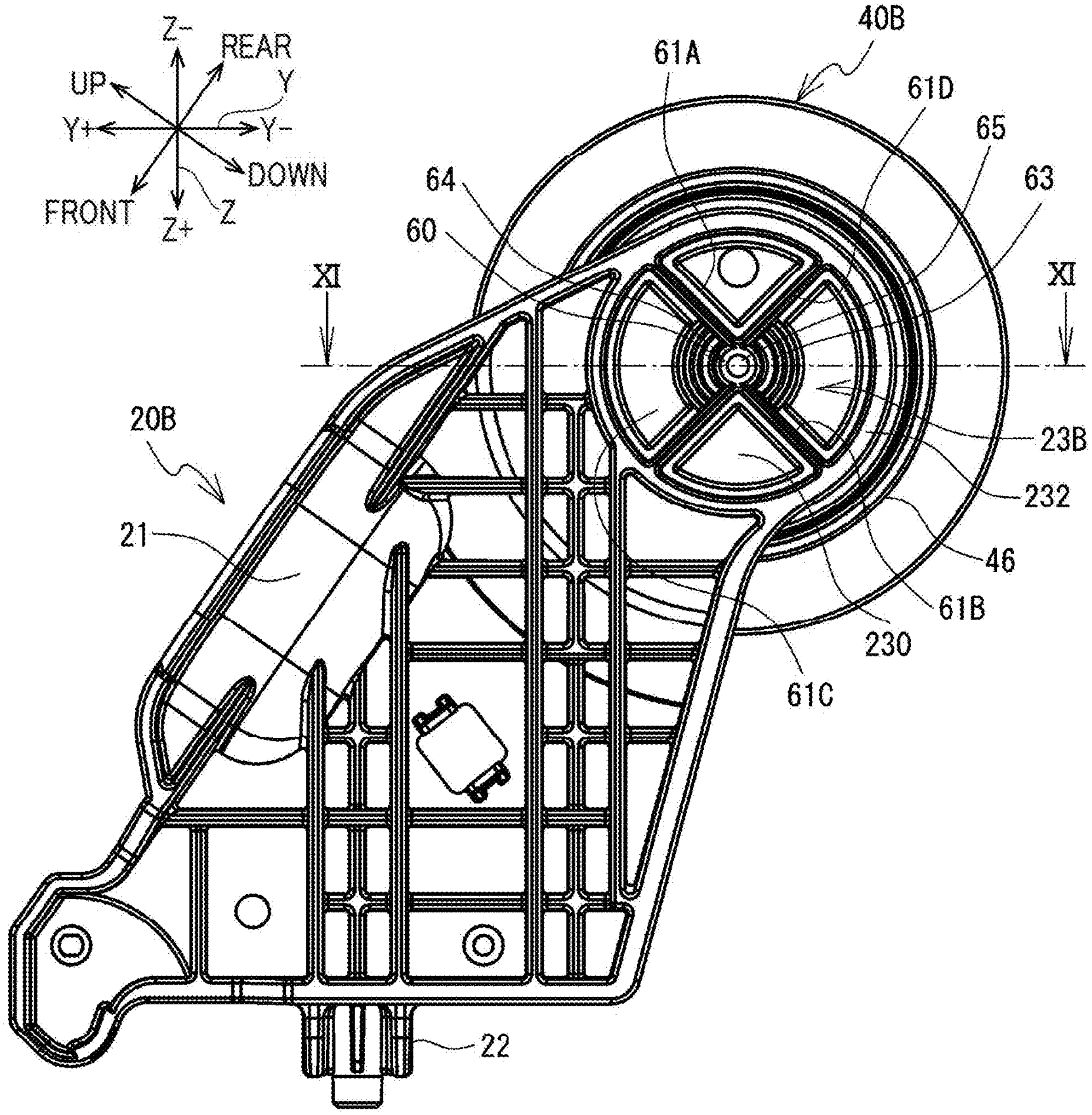
FIG. 10 is a right side view of a first adjuster 20B and a first support member 40B according to a modification to the embodiment.
Figure 11:
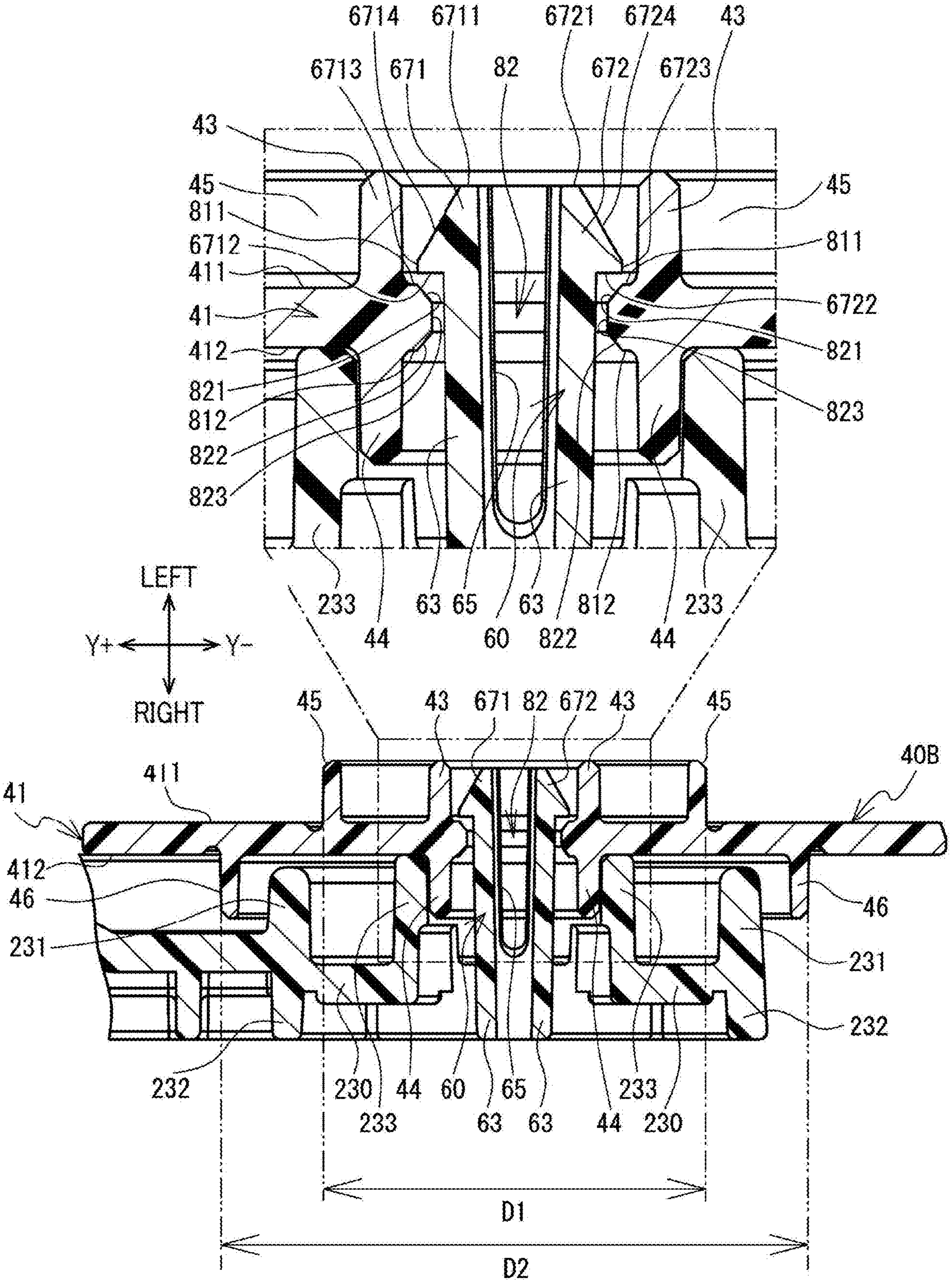
FIG. 11 is a cross-sectional view of the first adjuster 20B and the first support member 40B taken along a line XI-XI in FIG. 10.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

As a modification to the depicted embodiment, FIGS. 10 and 11 illustrate a first adjuster 20B and a first support member 40B according to this modification.

For simplifying description, like parts and components having the same configurations or the same functions as those of the parts and components of the above-described embodiment are designated by the same reference numerals as those of the embodiment. Further, with respect to FIGS. 10 and 11, the direction indicated by an arrow XI-XI shown in FIG. 10 will be referred to as "Z+ direction", and the direction opposite to the Z+ direction will be referred to as "Z− direction". The Z+ direction and Z− direction are collectively referred to as "Z direction" whenever appropriate. Further, the direction perpendicular to the Z direction will be referred to as "Y direction". The Y direction includes "Y+ direction", and "Y− direction" opposite each other.

The first adjuster 20B according to this modification is different from the first adjuster 20A of the embodiment in that the first adjuster 20B includes a mounting portion 23B instead of the mounting part 23A. The mounting portion 23B includes the base plate 230 formed with a through-hole 64 instead of the through-holes 24 and 25. The through-hole 64 is positioned at a radial center of the base plate 230, and penetrates through the base plate 230 in the left-right direction.

Ribs 61A, 61B, 61C and 61D are provided on the base plate 230. The ribs 61A, 61B, 61C and 61D protrude rightward from the right surface of the base plate 230. The rib 61A has one end (inner end) connected to a peripheral edge of the through-hole 64 on the Z− side, and extends frontward. The rib 61B has one end (inner end) connected to the peripheral edge of the through-hole 64 on the Z+ side, and extends downward. The rib 61C has one end connected to the one end (inner end) of the rib 61B, and extends frontward. The rib 61D has one end connected to the one end (inner end) of the rib 61A, and extends rearward.

The mounting portion 23B includes a hook part 60, instead of the hook 27 and the arcuate rib 26. Referring to FIG. 11, the hook part 60 includes a sleeve part 63 and a pair of pawl parts 671 and 672. The sleeve part 63 has an outer peripheral surface connected to the one end (inner end) of the rib 61A and the one end (inner end) of the rib 61B. The sleeve part 63 extends leftward from the portions connected to the one end of the rib 61A and to the one end of the rib 61B.

A pair of notches 65 is formed in an outer peripheral wall constituting a left end portion of the sleeve part 63. The notches 65 are arranged to oppose each other in the Z direction. Each notch 65 extends from the left edge of outer peripheral wall of the sleeve part 63 to a generally center portion in the left-right direction of the sleeve part 63. The notches 65 thus split the left end portion of the outer peripheral wall constituting the sleeve part 63 in the left-right direction to provide two free end portions opposing each other in the Y direction.

The pawl parts 671 and 672 are provided at the outer peripheral wall of the sleeve part 63. Specifically, the pawl parts 671 and 672 are respectively provided at the two opposing free end portions constituted by the outer peripheral wall of the sleeve part 63. The pawl part 671 provided at one of the free end portions of the sleeve part 63 and the pawl part 672 provided at the other free end portion of the sleeve part 63 function as a pair of deformable hooks of the first adjuster 20B in the present modification. The pawl parts 671 and 672 are aligned with each other in the Y direction. The pawl part 671 is positioned on the Y+ side of the pawl part 672. The pawl part 671 and the pawl part 672 are symmetrical in shape with respect to the Y direction.

The pawl part 671 has a configuration corresponding to the configuration of the pawl part 272 of the embodiment. The pawl part 671 has a first end face 6711, a second end face 6712, a third end face 6713, and a fourth end face 6714 whose configurations correspond to the configurations of the first end face 2721, the second end face 2722, the third end face 2723, and the fourth end face 2724, respectively.

The pawl part 672 has a first end face 6721, a second end face 6722, a third end face 6723, and a fourth end face 6724 which are symmetrical in shape with the first end face 6711, the second end face 6712, the third end face 6713, and the fourth end face 6714 with respect to the Y direction.

The first support member 40B is different from the first support member 40A in that the first support member 40B has a support hole 82, instead of the support hole 42. The support hole 82 is defined by a cylindrical inner peripheral surface 823. Guide surfaces 821 and 822 are connected to the inner peripheral surface 823. The guide surface 821 is connected to the left end of the inner peripheral surface 823, and is inclined to extend in a direction away from the radial center of the support plate part 41 toward the left end of the guide surface 821. The guide surface 822 is connected to the right end of the inner peripheral surface 823, and is inclined to extend in a direction away from the radial center of the support plate part 41 toward the right end of the guide surface 822.

In the present modification, the first surface 411 of the support plate part 41 includes a first engagement surface 811 positioned radially outward of the support hole 82 and inward of the protruding part 43. The second surface 412 of the support plate part 41 includes a second engagement surface 812 positioned radially outward of the support hole 82 and inward of the protruding part 43. The first engagement surface 811 and the second engagement surface 812 are both perpendicular to the left-right direction.

Now, a process of attaching and detaching the first support member 40B to and from the mounting portion 23B will be briefly described.

For attaching the first support member 40B having the posture 1A or the posture 1B to the mounting portion 23B, a user moves the first support member 40B rightward such that the first support member 40B approaches the mounting portion 23B.

The fourth end faces 6714 and 6724 are brought into abutment with the guide surface 822 or the guide surface 821. As the first support member 40B is moved further rearward by the user, the fourth end faces 6714 and 6724 are slidingly moved on the guide surface 822 or the guide surface 821, such that the pawl parts 671 and 672 are displaced radially inward. In the present modification, the pawl part 671 is displaced in the Y− direction and the pawl part 672 is displaced in the Y+ direction due to resilient deformation of the sleeve part 63. The third end faces 6713 and 6723 are thus positioned inside the support hole 82.

In accordance with further rightward movement of the first support member 40B by the user, the pawl parts 671 and 672 move past the support hole 82, and are positioned leftward of the support hole 82, whereupon the pawl part 671 moves in the Y+ direction and the pawl part 672 moves in the Y− direction due to of resilient restoration of the sleeve part 63. Hence, the second end faces 6712 and 6722 are seated on the first engagement surface 811 or the second engagement surface 812 and are engaged therewith. Thus, the attachment of the first support member 40B to the mounting portion 23B is completed.

For detaching the first support member 40B from the mounting portion 23B, a user moves the first support member 40B leftward. Hence, one end of the second end face 6712 in the Y+ direction and one end of the second end face 6722 in the Y− direction are slidingly moved on the guide surface 821 or the guide surface 822, such that the pawl parts 671 and 672 are displaced radially inward. In the present modification, the pawl part 671 is displaced in the Y− direction and the pawl part 672 is displaced in the Y+ direction because of resilient deformation of the sleeve part 63.

In accordance with further leftward movement of the first support member 40B by the user, the third end faces 6713 and 6723 are brought to the inside of the support hole 82, and the pawl parts 671 and 672 then move past the support hole 82. Thus, the detachment of the first support member 40B from the mounting portion 23B is completed. In the process of the detachment, the second end faces 6712 and 6722 are brought into sliding contact with the inclined guide surface 821 or the inclined guide surface 822, respectively. Hence, the left end portion of the sleeve part 63 can be bent radially inward, thereby facilitating detachment of the first support member 40B from the mounting portion 23B. In view of the foregoing, the printer according to the modification can contribute to easy detachment of the first support member 40B from the mounting portion 23B.

Incidentally, although not illustrated in the drawings, the second adjuster 30A and the second support member 50A may be modified to have symmetric structures with the first adjuster 20B and the first support member 40B with respect to the left-right direction. Other modifications will be described.

According to the above-described embodiment, the second adjuster 30A is movable in the left-right direction following the left-right movement of the first adjuster 20A. As a modification, the first adjuster 20A and the second adjuster 30A may be configured to move in the left-right direction independently of each other. Further, one of the first adjuster 20A and the second adjuster 30A may be fixed to the support base 11 and the other one of the first adjuster 20A and the second adjuster 30A may be movable in the left-right direction, provided that the distance between the first adjuster 20A and the second adjuster 30A in the left-right direction can be adjusted.

The support plate part 41 may be modified, as long as the support plate part 41 has the first surface 411, the second surface 412 and the support hole 42. For example, the support plate part 41 need not be a circular plate-like shape, but may have a rectangular plate-like shape in a side view. Likewise, the support plate part 51 may be modified, as long as the support plate part 51 has the first surface 511, the second surface 512 and the support hole 52. The support plate part 41 and the support plate part 51 may have configurations different from each other. In the above-described embodiment, the protruding part 45 is in a form of the annular rib. As a modification, the protruding part 45 may be provided by a combination of a plurality of protrusions protruding from the first surface 411. In this case, the plurality of protrusions is configured to be fitted to the inner peripheral surface of the sleeve N1 to support the roll M1.

Similarly, the protruding part 46 may be provided by a combination of a plurality of protrusions protruding from the second surface 412.

Likewise, the protruding part 55 may be provided by a combination of a plurality of protrusions protruding from the first surface 511. The protruding part 56 may be provided by a combination of a plurality of protrusions protruding from the second surface 512.

Further, radial centers of the annular protruding parts 45, 46, 55 and 56 need not be coincident with the corresponding radial centers of the support plate parts 41 and 51. The annular protruding part 45 may be inclined toward the radial center of the protruding part 45 as long as the protruding part 45 protrudes from the first surface 411. The annular protruding part 46 may be inclined toward the radial center of the protruding part 46 as long as the protruding part 46 protrudes from the second surface 412. The annular protruding part 55 may be inclined toward the radial center of the protruding part 55 as long as the protruding part 55 protrudes from the first surface 511. The annular protruding part 56 may be inclined toward the radial center of the protruding part 56 as long as the protruding part 56 protrudes from the second surface 512.

In the above-described embodiment, attachment and detachment of the first support member 40A and the second support member 50A to and from the first adjuster 20A and the second adjuster 30A is performed by pulling the levers 28 and 38 upward. As a modification, attachment and detachment of the first support member 40A and the second support member 50A may be performed by pushing the levers 28 and 38 downward. In this case, each of the mounting parts 23A and 33A may have a configuration symmetrical with that of the embodiment in the up-down direction.

The lever 28 may not have the plurality of ribs 282. Instead of the plurality of ribs 282 provided on the extension part 281, a single rib 282 may be provided on the extension part 281. Instead of the plurality of ribs 382 provided on the extension part 381, a single rib 382 may be provided on the extension part 381.

In the above-described embodiment, the hook 27 and the lever 28 are provided at the specific part 252 of the through-hole 25. Alternatively, the hook 27 and the lever 28 may be positioned apart from the peripheral edge of the through-hole 25. Similarly, while the hook 37 and the lever 38 are provided at the specific part 352 of the through-hole 35 in the above-described embodiment, the hook 37 and the lever 38 may be positioned apart from the peripheral edge of the through-hole 35. Still further, the levers 28 and 38 may be omitted from the respective mounting parts 23A and 33A, as in the modification of FIGS. 10 and 11.

In the above-described embodiment, the right end of the extension part 281 is aligned with the right end of the annular rib 232 in the left-right direction. As a modification, the right end of the extension part 281 may be positioned further leftward than the right end of the annular rib 232. Even in this case, since the lever 28 does not protrude rightward relative to the annular rib 232, unexpected operation to the lever 28 by the user can be restrained. As a further alternative, the right end of the extension part 281 may be positioned rightward relative to the right end of the annular rib 232. Similarly, the left end of the extension part 381 may be positioned further rightward than the left end of the annular rib 332. Further, the left end of the extension part 381 may be positioned further leftward relative to the left end of the annular rib 332. Further, the annular ribs 232 and 332 may be omitted from the mounting parts 23A and 33A, respectively.

The second end face 2722 of the hook 27 may be inclined relative to the left-right direction. The second end face 3722 of the hook 37 may be inclined relative to the left-right direction. At least one of the first engagement surface 4111 and the second engagement surface 4121 may be inclined relative to the left-right direction. At least one of the first engagement surface 5111 and the second engagement surface 5121 may be inclined relative to the left-right direction.

The protruding part 43 may protrude from the peripheral edge of the support hole 42. In this case, the first engagement surface 4111 is omitted from the first surface 411. The protruding part 44 may protrude from the peripheral edge of the support hole 42. In this case, the second engagement surface 4121 is omitted from the second surface 412. Likewise, the protruding part 53 may protrude from the peripheral edge of the support hole 52. In this case, the first engagement surface 5111 is omitted from the first surface 511. The protruding part 54 may protrude from the peripheral edge of the support hole 52. In this case, the second engagement surface 5121 is omitted from the second surface 512.

The hook 27 may not have the fourth end face 2724. In this case, the upper end of the first end face 2721 is connected to the left end of the third end face 2723. Alternatively, the fourth end face 2724 may be curved to protrude upward or downward as long as the fourth end face 2724 extends diagonally rightward toward the upper end of the fourth end face 2724. Likewise, the hook 37 may not have the fourth end face 3724. In this case, the upper end of the first end face 3721 is connected to the right end of the third end face 3723. The fourth end face 2724 may be curved to protrude upward or downward as long as the fourth end face 3724 extends diagonally leftward toward the upper end of the fourth end face 3724.

The tape roll M may be of a core-less type in which the tape P is rolled to form a hollow center space without a paper sleeve.

The hook 27 and lever 28 need not be one each in the mounting part 23A, but a plurality of hooks 27 and a plurality of levers 28 may be provided in the mounting part 23A. The hook 37 and lever 38 need not be one each in the mounting part 33A, but and more than one hook 37 and lever 38 may be provided in the mounting part 33A.

The left end of the arcuate rib 26 may be provided with a pawl protruding downward and leftward. The right end of the arcuate rib 36 may be provided with a pawl protruding downward and rightward.

At least one of the protruding parts 43 and 44 may be omitted from the first support member 40A. The protruding parts 43 and 44 may not have an annular shape, but may be provided as a combination of a plurality of protrusions. At least one of the protruding parts 53 and 54 may be omitted from the second support member 50A. The protruding parts 53 and 54 may not have an annular shape, but may be provided as a combination of a plurality of protrusions.

Various parts and components appearing in the above-described embodiment and modifications may be suitably selected and combined together, as long as the selection and combination do not cause any technically conflicting problems.

What is claimed is:

1. A printer configured to perform printing on either a first elongated printing medium paid out from a first roll or a second elongated printing medium paid out from a second roll, the first roll having a first sleeve over which the first elongated printing medium is wound, the second roll having a second sleeve over which the second elongated printing medium is wound, the second sleeve having an inner diameter greater than an inner diameter of the first sleeve, the printer comprising:

a housing that is open in a first direction, the housing providing an accommodation space for accommodating therein either the first roll or the second roll such that the first sleeve or the second sleeve extends in a second direction perpendicular to the first direction;

a first adjuster provided in the accommodation space;

a second adjuster provided in the accommodation space, the first adjuster and the second adjuster facing each other in the second direction such that a distance therebetween in the second direction is adjustable;

a first support member attachable to and detachable from the first adjuster, the first support member comprising:

a first support plate part having a first surface and a second surface opposite each other in the second direction, the first support plate part having a first support hole penetrating through the first support plate part in the second direction from the first surface to the second surface;

a first protruding part protruding from the first surface and surrounding the first support hole, the first protruding part having a first outer diameter; and a second protruding part protruding from the second surface and surrounding the first support hole, the second protruding part having a second outer diameter greater than the first outer diameter, the first support member being attachable to the first adjuster such that either the first surface or the second surface of the first support plate part faces the second adjuster in the second direction; and a second support member attachable to and detachable from the second adjuster, the second support member comprising:

a second support plate part having a first surface and a second surface opposite each other in the second direction, the second support plate part having a second support hole penetrating through the second support plate part in the second direction from the first surface of the second support plate part to the second surface of the second support plate part;

a first protruding part protruding from the first surface of the second support plate part and surrounding the second support hole, the first protruding part of the second support member having the first outer diameter; and a second protruding part protruding from the second surface of the second support plate part and surrounding the second support hole, the second protruding part of the second support member having the second outer diameter, the second support member being attachable to the second adjuster such that either the first surface of the second support plate part or the second surface of the second support plate part faces the first adjuster in the second direction, wherein the first adjuster comprises a first hook extending toward the second adjuster in the second direction, the first hook extending through the first support hole and engaging with the first support plate part upon attachment of the first support member to the first adjuster, wherein the second adjuster comprises a second hook extending toward the first adjuster in the second direction, the second hook extending through the second support hole and engaging with the second support plate part upon attachment of the second support member to the second adjuster, and wherein, in a first state where the first support member and the second support member are attached to the first adjuster and the second adjuster respectively such that the first surface of the first support plate part and the first surface of the second support plate part oppose each other in the second direction, the first protruding part of the first support member and the first protruding part of the second support member are fitted in the first sleeve of the first roll when the first roll is accommodated in the accommodation space, and in a second state where the first support member and the second support member are attached to the first adjuster and the second adjuster respectively such that the second surface of the first support plate part and the second surface of the second support plate part oppose each other in the second direction, the second protruding part of the first support member and the second protruding part of the second support member are fitted in the second sleeve of the second roll when the second roll is accommodated in the accommodation space.

2. The printer according to claim 1, wherein the first adjuster further comprises:

a first base plate having a first through-hole penetrating through the first base plate in the second direction, the first base plate having a first inner peripheral portion defining the first through-hole, the first hook extending from a first specific part which is a part of the first inner peripheral portion of the first base plate; and a first lever having one end connected to the first hook at the first specific part, the first lever protruding from the first specific part away from the second adjuster in the second direction, and wherein the second adjuster further comprises:

a second base plate facing the first base plate in the second direction, the second base plate having a second through-hole penetrating through the second base plate in the second direction, the second base plate having a second inner peripheral portion defining the second through-hole, the second hook extending from a second specific part which is a part of the second inner peripheral portion of the second base plate; and a second lever having one end connected to the second hook at the second specific part, the second lever protruding from the second specific part away from the first adjuster in the second direction.

3. The printer according to claim 2, wherein the first adjuster further comprises a first rib surrounding the first through-hole and protruding from the first base plate away from the second adjuster in the second direction, the first rib having a protruding end in the second direction, wherein the first lever has a protruding end in the second direction, the protruding end of the first lever being aligned with or positioned inward of the protruding end of the first rib in the second direction, wherein the second adjuster further comprises a second rib surrounding the second through-hole and protruding from the second base plate away from the first adjuster in the second direction, the second rib having a protruding end in the second direction, and wherein the second lever has a protruding end in the second direction, the protruding end of the second lever being aligned with or positioned inward of the protruding end of the second rib in the second direction.

4. The printer according to claim 2, wherein the first hook comprises:

a first extending part having one end connected to the first specific part and an other end extending toward the second adjuster in the second direction; and a first pawl part extending from the other end of the first extending part and protruding therefrom in a hook protruding direction crossing the second direction, the first pawl part having a first engaging surface extending perpendicularly to the second direction and facing the first base plate in the second direction, wherein each of the first surface of the first support plate part and the second surface of the first support plate part includes an engagement surface surrounding the first support hole and extending perpendicularly to the second direction, wherein the second hook comprises:

a second extending part having one end connected to the second specific part and an other end extending toward the first adjuster in the second direction; and a second pawl part positioned on the other end of the second extending part and protruding therefrom in the hook protruding direction, the second pawl part having a second engaging surface extending perpendicularly to the second direction and facing the second base plate in the second direction, wherein each of the first surface of the second support plate part and the second surface of the second support plate part includes an engagement surface surrounding the second support hole and extending perpendicularly to the second direction, and wherein in the first state, the first engaging surface of the first hook is engaged with the engagement surface on the first surface of the first support plate part, and the second engaging surface of the second hook is engaged with the engagement surface on the first surface of the second support plate part, and in the second state, the first engaging surface of the first hook is engaged with the engagement surface on the second surface of the first support plate part, and the second engaging surface of the second hook is engaged with the engagement surface on the second surface of the second support plate part.

5. The printer according to claim 1, wherein the first hook comprises:

a first extending part extending toward the second adjuster in the second direction to have a free end; and a first pawl part protruding from the free end of the first extending part in a hook protruding direction crossing the second direction to have a protruding end, the first pawl part having a first guide surface that is inclined to extend away from the second adjuster in the second direction toward the protruding end of the first pawl part, and wherein the second hook comprises:

a second extending part extending toward the first adjuster in the second direction to have a free end; and a second pawl part protruding from the free end of the second extending part in the hook protruding direction to have a protruding end, the second pawl part having a second guide surface that is inclined to extend away from the first adjuster in the second direction toward the protruding end of the second pawl part.

6. The printer according to claim 1, wherein the first hook comprises:

a first extending part extending toward the second adjuster in the second direction to have a free end; and a first pawl part protruding from the free end of the first extending part in a hook protruding direction crossing the second direction, wherein the first support plate part has:

a first guide surface connected to the first surface of the first support plate part and positioned around the first support hole; and a second guide surface connected to the second surface of the first support plate part and positioned around the first support hole, the first guide surface and the second guide surface extending to approach each other in the second direction toward a center of the first support hole, wherein the second hook comprises:

a second extending part extending toward the first adjuster in the second direction to have a free end; and a second pawl part protruding from the free end of the second extending part in the hook protruding direction, wherein the second support plate part has:

a first guide surface connected to the first surface of the second support plate part and positioned around the second support hole; and a second guide surface connected to the second surface of the second support plate part and positioned around the second support hole, the first guide surface of the second support plate part and the second guide surface of the second support plate part extending to approach each other in the second direction toward a center of the second support hole, and wherein in the first state, the first pawl part of the first hook faces the first guide surface of the first support plate part in the second direction, and the second pawl part of the second hook faces the first guide surface of the second support plate part in the second direction, and in the second state, the first pawl part of the first hook faces the second guide surface of the first support plate part in the second direction, and the second pawl part of the second hook faces the second guide surface of the second support plate part in the second direction.

* * * * *